US007387571B2

(12) United States Patent
Walker et al.

(10) Patent No.: US 7,387,571 B2
(45) Date of Patent: Jun. 17, 2008

(54) METHOD AND APPARATUS FOR LINKED PLAY GAMING

(75) Inventors: Jay S. Walker, Ridgefield, CT (US); James A. Jorasch, Stamford, CT (US); Daniel E. Tedesco, Huntington, CT (US); Stephen C. Tulley, Fairfield, CT (US); Geoffrey M. Gelman, Stamford, CT (US); Steven M. Santisi, Ridgefield, CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 11/422,778

(22) Filed: Jun. 7, 2006

(65) Prior Publication Data

US 2006/0211479 A1 Sep. 21, 2006

Related U.S. Application Data

(63) Continuation of application No. 10/254,831, filed on Sep. 25, 2002.

(60) Provisional application No. 60/324,572, filed on Sep. 25, 2001.

(51) Int. Cl.
*A63F 13/00* (2006.01)

(52) U.S. Cl. .............................. 463/26; 463/25; 463/27; 463/28; 463/40; 463/42; 463/16

(58) Field of Classification Search ................... 463/16, 463/17, 19, 20, 40, 42, 25–28
See application file for complete search history.

(56) References Cited

U.S. PATENT DOCUMENTS

| | | | | |
|---|---|---|---|---|
| 2,732,210 | A | 1/1956 | Heide | 463/60 |
| 4,621,814 | A | 11/1986 | Stepan et al. | 273/183 A |
| 4,636,951 | A | 1/1987 | Harlick | 364/412 |
| 4,669,731 | A | 6/1987 | Clarke | 273/143 R |
| 4,773,647 | A | 9/1988 | Okada et al. | 273/143 R |

(Continued)

FOREIGN PATENT DOCUMENTS

| | | | |
|---|---|---|---|
| EP | 843272 | A1 | 5/1998 |

(Continued)

OTHER PUBLICATIONS

"Revealing the Casinos Best-Kept-Secrets—Hot Slots & Reel Deals", Atlantic City Insider, Oct. 1996, vol. 1, No. 2, 5pp.

(Continued)

*Primary Examiner*—Xuan M. Thai
*Assistant Examiner*—Steven J. Hylinski
(74) *Attorney, Agent, or Firm*—Walker Digital Management, LLC

(57) ABSTRACT

The invention includes a system and method for providing linked play via gaming and other devices. In some embodiments, a casino server registers a group for linked play and a group objective and format are established. The linked play commences according to the group format on the gaming devices while the casino server, or another device, concurrently facilitates interaction between the group members operating the gaming devices. The linked play is terminated according to the group format and a determination is made by the casino server whether the group objective has been achieved. Prizes are awarded via the gaming devices if the group objective was achieved.

43 Claims, 13 Drawing Sheets

U.S. PATENT DOCUMENTS 4,837,422 A 6/1989 Dethloff et al. .............. 235/380
4,837,728 A 6/1989 Barrie et al. .................. 463/27
4,838,552 A 6/1989 Hagiwara .................... 463/20
4,856,787 A 8/1989 Itkis
4,926,327 A 5/1990 Sidley ........................ 364/412
5,042,818 A 8/1991 Weingardt .................. 273/292
5,083,271 A 1/1992 Thacher et al. ............... 700/92
5,116,055 A * 5/1992 Tracy .......................... 463/27
5,123,649 A 6/1992 Tiberio ................... 273/143 R
5,159,549 A 10/1992 Hallman, Jr. et al. ........ 364/412
5,173,851 A 12/1992 Off et al. .................... 364/401
5,178,390 A 1/1993 Okada .................... 273/143 R
5,179,517 A 1/1993 Sarbin et al. .................. 463/25
5,242,163 A 9/1993 Fulton .................... 273/85 CP
5,275,400 A 1/1994 Weingardt et al. ...... 273/85 CP
5,280,909 A 1/1994 Tracy ..................... 273/138 A
5,324,035 A 6/1994 Morris et al. ........... 273/138 A
5,342,047 A 8/1994 Heidel et al. ............ 273/85 CP
5,342,049 A 8/1994 Wichinsky et al. ...... 273/119 R
5,344,144 A 9/1994 Canon ........................ 273/138
5,356,140 A 10/1994 Dabrowski et al. ...... 273/85 CP
5,377,973 A 1/1995 Jones et al. ............. 273/85 CP
5,393,057 A 2/1995 Marnell, II .............. 273/85 CP
5,393,061 A 2/1995 Manship et al. ......... 273/143 R
5,409,225 A 4/1995 Kelly et al. ............. 273/118 A
5,472,194 A 12/1995 Breeding et al. ........ 273/138 A
5,482,289 A 1/1996 Weingardt .................. 273/269
5,494,287 A 2/1996 Manz ..................... 273/143 R
5,511,781 A 4/1996 Wood et al. ............. 273/85 CP
5,531,440 A 7/1996 Dabrowski ................... 463/12
5,544,892 A 8/1996 Breeding .................... 273/292
5,558,339 A * 9/1996 Perlman ...................... 463/42
5,559,312 A 9/1996 Lucero ........................ 463/25
5,560,603 A 10/1996 Seelig et al. ................ 273/143
5,564,700 A 10/1996 Celona ........................ 463/27
5,580,309 A 12/1996 Piechowiak et al. ........... 463/16
5,593,349 A 1/1997 Miguel et al. ................. 463/30
5,597,163 A 1/1997 Takemoto et al. ........... 273/309
5,603,502 A 2/1997 Nakagawa .................. 273/292
5,611,535 A 3/1997 Tiberio ................... 273/143 R
5,611,730 A 3/1997 Weiss .......................... 463/20
5,621,201 A 4/1997 Langhans et al. ........... 235/380
5,636,209 A * 6/1997 Perlman ..................... 370/281
5,639,088 A 6/1997 Schneider et al. ........ 273/138.2
5,653,635 A * 8/1997 Breeding ..................... 463/11
5,655,961 A 8/1997 Acres et al. ................... 463/27
5,674,128 A 10/1997 Holch et al. .................. 463/42
5,695,400 A 12/1997 Fennell, Jr. et al. ........... 463/42
5,697,844 A * 12/1997 Von Kohorn ................. 463/40
5,702,304 A 12/1997 Acres et al. ................... 463/29
5,711,715 A 1/1998 Ringo et al. ................... 473/9
5,741,183 A 4/1998 Acres et al. ................... 463/42
5,752,882 A 5/1998 Acres et al. ................... 463/42
5,755,621 A 5/1998 Marks et al. .................. 463/42
5,761,647 A 6/1998 Boushy ....................... 705/10
5,766,076 A 6/1998 Pease et al. ................... 463/27
5,768,382 A 6/1998 Schneier et al. ............. 380/251
5,770,533 A 6/1998 Franchi ....................... 763/42
5,772,506 A 6/1998 Marks et al. .................. 463/13
5,772,509 A 6/1998 Weiss .......................... 463/16
5,811,772 A 9/1998 Lucero ....................... 235/380
5,820,459 A * 10/1998 Acres et al. ................... 463/25
5,823,879 A * 10/1998 Goldberg et al. .............. 463/42
5,836,586 A 11/1998 Marks et al. ................ 273/292
5,848,932 A 12/1998 Adams ........................ 463/20
5,851,147 A 12/1998 Stupak et al. ................. 463/13
5,855,008 A 12/1998 Goldhaber et al. ............ 705/14
5,882,260 A 3/1999 Marks et al. .................. 463/13
5,882,262 A 3/1999 Ballhorn ...................... 463/43
5,910,048 A 6/1999 Feinberg ...................... 463/25
5,964,660 A 10/1999 James et al. ................... 463/1
5,967,896 A 10/1999 Jorasch et al. ................ 463/25
5,979,702 A 11/1999 Hennessey et al. .......... 221/206
5,980,384 A 11/1999 Barrie ......................... 463/16
6,010,404 A 1/2000 Walker et al. ................. 463/21
6,012,982 A 1/2000 Piechowiak et al. ........... 463/16
6,019,374 A 2/2000 Breeding .................... 273/292
6,024,642 A 2/2000 Stupak ......................... 463/20
6,033,307 A 3/2000 Vancura ....................... 463/20
6,039,648 A 3/2000 Guinn et al. .................. 463/16
6,077,162 A 6/2000 Weiss .......................... 463/26
6,077,163 A 6/2000 Walker et al. ................. 463/26
6,089,975 A 7/2000 Dunn .......................... 463/16
6,089,980 A 7/2000 Gauselmann
6,093,100 A 7/2000 Singer et al. .................. 463/13
6,113,102 A 9/2000 Marks et al. ................ 273/292
6,117,011 A 9/2000 Lvov ........................... 463/25
6,135,882 A 10/2000 Kadlic ......................... 463/13
6,142,872 A 11/2000 Walker et al. ................. 463/16
6,162,122 A * 12/2000 Acres et al. ................... 463/29
6,206,782 B1 3/2001 Walker et al. ................. 463/25
6,210,275 B1 * 4/2001 Olsen .......................... 463/16
6,234,897 B1 5/2001 Frohm et al. .................. 463/20
6,241,608 B1 * 6/2001 Torango ...................... 463/27
6,247,643 B1 6/2001 Lucero ....................... 235/380
6,257,981 B1 * 7/2001 Acres et al. ................... 463/26
6,264,560 B1 7/2001 Goldberg et al. .............. 463/42
6,270,412 B1 8/2001 Crawford et al. .............. 463/20
6,287,202 B1 9/2001 Pascal et al. .................. 463/42
6,293,865 B1 * 9/2001 Kelly et al. ................... 463/16
6,312,332 B1 11/2001 Walker et al.
6,319,122 B1 * 11/2001 Packes et al. ................. 463/16
6,334,814 B1 1/2002 Adams ........................ 463/20
6,361,441 B1 3/2002 Walker et al. ................. 463/42
6,364,765 B1 4/2002 Walker et al. ................. 463/16
6,375,568 B1 4/2002 Roffman et al. ............... 463/23
6,394,456 B1 5/2002 Long .......................... 273/292
6,416,408 B2 7/2002 Tracy et al. ................... 463/16
6,439,993 B1 8/2002 O'Halloran .................. 463/16
6,461,241 B1 10/2002 Webb et al. ................... 463/20
6,471,208 B2 10/2002 Yoseloff et al. ......... 273/143 R
6,482,089 B2 11/2002 DeMar et al. ................. 463/20
6,503,146 B2 1/2003 Walker et al. ................. 463/25
6,514,144 B2 2/2003 Riendeau et al. .............. 463/42
6,645,074 B2 11/2003 Thomas et al. ................ 463/20
6,652,378 B2 11/2003 Cannon et al. ................ 463/20
6,656,048 B2 12/2003 Olsen .......................... 463/25
6,663,487 B1 12/2003 Ladner ........................ 463/13
6,692,353 B2 2/2004 Walker et al. ................. 463/16
6,712,699 B2 3/2004 Walker et al. ................. 463/30
6,733,390 B2 5/2004 Walker et al. ................. 463/23
6,837,793 B2 1/2005 McClintic .................... 463/42
6,902,478 B2 6/2005 McClintic .................... 463/16
6,923,719 B2 8/2005 Wolf ........................... 463/16
2002/0055381 A1 5/2002 Tarantino ..................... 463/20
2003/0027628 A1 2/2003 Luciano ....................... 463/20
2003/0064807 A1 4/2003 Walker et al. ................. 463/42
2003/0078101 A1 4/2003 Schneider et al. ............. 463/42
2003/0224852 A1 12/2003 Walker et al. ................. 463/20

FOREIGN PATENT DOCUMENTS

GB 2 161 008 A 1/1986
WO WO96/08295 3/1996
WO WO 03/018150 A1 3/2003

OTHER PUBLICATIONS

Website: "CC&GTCC 3rd Annual Championship Poker Challenge during the CC&GTCC Convention", (http //www ccgtcc com/poker2001 htm), May 26, 2001, 3pp.

Website: "Money Time at Casino Windsor", (http //www casinowindsor com/casino/slots/moneytime htm), download date: Jul. 25, 2001, 1 pg.

Fine, Adam, "Players Network Gaming Guide Article—Big River", The Casino Player, (http //www playersnetwork com/travel/articles/ big-river 001,005 html), download date: Jul. 25, 2001, 2pp.
Website: "Casino Circle! Presents $$$ Free $$$ Online Slot Tournaments and other Choice Online Casino Games of Chance, Luck and Skill that Pay-Off!", (http www sidewalkshoppes com/ slots_free_tournaments html), download date: Jul. 26, 2001, 8pp.
Website: "Casinos featuring Slot Tournaments in Las Vegas—Slot Tournaments and how they work", (http www interexna com/tournaments html), download date: Jul. 26, 2001, 2pp.
Website: "gameland.com", (http www gameland com/home/), download date: Sep. 5, 2001, 2pp.
Notice of Allowability for U.S. Appl. No. 09/052,835 dated Mar. 22, 2000, 2pp.
Notice of Allowability for U.S. Appl. No. 09/052,835 dated Mar. 13, 2000, 9pp.
Office Action for U.S. Appl. No. 09/108,827, dated Oct. 26, 2000, 8pp.
Office Action for U.S. Appl. No. 09/108,827 dated Mar. 23, 2000, 12pp.
Notice of Allowability for U.S. Appl. No. 09/108,827 dated Jun. 15, 2001, 3pp.
Office Action for U.S. Appl. No. 10/006,402 dated Mar. 12, 2003, 14pp.
Office Action for U.S. Appl. No. 10/006,402 dated Sep. 8, 2003, 7pp.
Notice of Allowability for U.S. Appl. No. 10/006,402 dated Jan. 28, 2004, 3pp.
Author Unknown, "Hot Slots & Reel Deals", Atlantic City Insider, Oct. 1996, vol. 1, No. 2., 5pp.
"Mega Vigil", Las Vegas Adviser, Jul. 1998 at p. 12.
Office Action for U.S. Appl. No. 09/152,405, dated Mar. 7, 2000, 14pp.
Notice of Allowability for U.S. Appl. No. 09/152,402, dated Sep. 6, 2000, 5pp.
Office Action for U.S. Appl. No. 09/793,020, dated Sep. 28, 2001, 10pp.
Office Action for U.S. Appl. No. 10/190,722, dated Dec. 17, 2003, 10pp.
Notice of Allowability for U.S. Appl. No. 10/190,722, dated Jun. 18, 2004, 8pp.
Office Action for U.S. Appl. No. 10/190,722, dated Sep. 10, 2003, 4pp.
Office Action for U.S. Appl. No. 10/869,975, dated May 15, 2007, 12pp.
Office Action for U.S. Appl. No. 10/869,975, dated Sep. 22, 2006, 20pp.
Grochowski, John, "Players Look for Edge With Casino Gimmicks", Chicago Sun-Times, Aug. 25, 1995, Section: Weekend Plus, Gaming, p. 15, NC., 2pp.
Rose, Bob, "New Ways for the House to Win", St. Louis Post-Dispatch, Oct. 3, 1996, Section: Get Out, p. 50, 2pp.
"Triple Play Poker Takes Casino Industry by Storm", IGT Press Releases, Feb. 18, 1998 (http://www.igtgame.com/press/02/18/98.html), 2pp.
Website: Brokopp, John G., "One Way to Manipulate Players' Clubs", Casino City Times, Feb. 6, 2001, (http://brokopp.casinocitytimes.com/articles/534.html), 3pp.
Dancer, Bob and Compton, Jeffrey, "Player's Edge: Cannery's machines tighter than most locals' casinos", Las Vegas Review-Journal (Nevada), Jan. 10, 2003, 2pp.
Website: Brokopp, John G., "Player's Club Strategy for Couples", Casino City Times, Dec. 3, 2003, (http://brokopp.casinocitytimes.com/articles/8065.html)., 3pp.
Website: "Tunica Casino Slot and Table Play Club", (http://www.tunica-ms.com/casino_slot_clubs.htm), download date: Mar. 26, 2004, 3pp.
Office Action for U.S. Appl. No. 10/811,583, dated Jun. 27, 2006, 12pp.
Office Action for U.S. Appl. No. 10/811,583, dated Jan. 31, 2007, 17pp.
Office Action for U.S. Appl. No. 10/811,583, dated Jul. 10, 2007, 17pp.
Office Action for U.S. Appl. No. 10/794,338, dated Feb. 27, 2007, 12pp.
Office Action for U.S. Appl. No. 10/794,338, dated Jan. 30, 2007, 12pp.
Office Action for U.S. Appl. No. 10/794,338, dated Aug. 11, 2006, 12pp.
Office Action for U.S. Appl. No. 10/794,338, dated Dec. 20, 2005, 8 pp.
Office Action for U.S. Appl. No. 10/254,831, dated Sep. 22, 2006, 23pp.
Office Action for U.S. Appl. No. 10/254,831, dated Mar. 8, 2007, 22pp.
Office Action for U.S. Appl. No. 11/422,778, dated Mar. 20, 2007, 15pp.
Website: "Money Time at Casino Windsor", (http://www.casinowindsor.com/casino/slots/moneytime.htm), download date: Jul. 25, 2001, 1 pg.
Office Action for U.S. Appl. No. 10/067,576, dated Feb. 28, 2003, 13pp.
Office Action for U.S. Appl. No. 11/427,131, dated Apr. 3, 2007, 13pp.
Office Action for U.S. Appl. No. 11/427,131, dated Aug. 22, 2007, 9pp.
Office Action for U.S. Appl. No. 11/427,131, dated Sep. 12, 2006, 10 pp.
Notice of Allowability for U.S. Appl. No. 09/793,020, dated Feb. 26, 2001, 4pp.
Notice of Allowability for U.S. Appl. No. 09/793,020, dated Mar. 26, 2001, 7pp.
Office Action for U.S. Appl. No. 10/414,934, dated Nov. 16, 2006, 28pp.
Office Action for U.S. Appl. No. 10/794,338, dated Aug. 1, 2007, 13pp.
Advisory Action for U.S. Appl. No. 10/794,338, dated Oct. 1, 2007, 3pp.
Office Action for U.S. Appl. No. 10/794,338 dated Dec. 20, 2003, 8pp.
Office Action for U.S. Appl. No. 10/794,388 dated Jan. 30, 2007, 12pp.
Office Action for U.S. Appl. No. 10/190,722 dated Jan. 15, 2003, 12pp.

* cited by examiner

600

| OUTCOME ON FIRST DEVICE 602 | PAYOUT FOR OUTCOME ON FIRST DEVICE ALONE (TOKENS) 604 | OUTCOME ON SECOND DEVICE 606 | PAYOUT FOR OUTCOME ON SECOND DEVICE ALONE (TOKENS) 608 | PAYOUT FOR SIMULTANEOUS OCCURRENCE OF THE TWO OUTCOMES (TOKENS) 610 |
|---|---|---|---|---|
| ORANGE-ORANGE-ORANGE | 20 | FOUR OF A KIND | 25 | 200 |
| BAR-BAR-BAR | 50 | FOUR OF A KIND | 25 | 1000 |
| 7-7-7 | 100 | ROYAL-STRAIGHT-FLUSH | 800 | 100,000 |
| 7-7-7 | 100 | STRAIGHT-FLUSH | 50 | 5000 |

FIG. 6

208

| PLAYER TRACKING CARD NUMBER 800 | NAME 802 | FINANCIAL ACCOUNT IDENTIFIER 804 | HOME ADDRESS 806 | E-MAIL ADDRESS 808 | DEMOGRAPHIC 810 | DESIRED GROUP CHARACTERISTICS 812 | LIFETIME THEORETICAL WIN 813 |
|---|---|---|---|---|---|---|---|
| P111123 | SAM BROWN | 1111-1111-1111-1111 | ANYPLACE, USA | SBROWN@RAIN.COM | MALE, AGE 23 | QUARTER SLOT PLAYERS | $2345 |
| P222234 | LINDA JONES | 2222-2222-2222-2222 | SOMEPLACE, USA | LJONES@SHINE.COM | FEMALE, AGE 47 | GROUP WITH ONLY P444444 | $765 |
| P333345 | MARGE SMITH | 3333-3333-3333-3333 | ANYWHERE, USA | MARGE@EAST.COM | FEMALE, AGE 65 | FEMALES OVER 55 | $6100 |

FIG. 8

210

| GROUP IDENTIFIER 900 | GROUP MEMBERS 902 | COMMON CHARACTERISTICS 904 | GROUP SESSIONS 906 |
|---|---|---|---|
| G1111 | P222210, P333321 | SAME FAMILY | S1122, S2233, S3344 |
| G2222 | P444432, P555543, P666654, P777765, P888876 | WOMEN FROM OHIO | S2211 |
| G3333 | P98889, P877778, P766667 | FRIENDS | S3333, S4444, S5555, S6666 |
| G4444 | P100001, P200002, P300003, ..., P900009 | NONE | S7777, S8888 |

FIG. 9

212

| SESSION IDENTIFIER 1000 | GROUP IDENTIFIER 1002 | GAME 1004 | ENTRY FEE 1006 | SESSION 1008 | OBJECTIVE 1010 | WAGER AMOUNT 1012 | PRIZE STRUCTURE 1014 | RESULT 1016 |
|---|---|---|---|---|---|---|---|---|
| S1122 | G1111 | 3-REEL SLOTS | $20 EACH | 10:00AM-12:00PM 5/9/04 | HIGHEST NET WINNINGS | $1 | 1ST-$39 | P333321 WON 1ST |
| S2211 | G2222 | VIDEO POKER | NONE | 3:30PM-5:30PM 6/12/04, LIMIT 50 MINUTES/HOUR | MOST SKILLFUL PLAY | $0.25 | 1ST-FREE DINNER, 2ND-FREE LUNCH | P555543 WON 1ST, P666654 WON 2ND |
| S3333 | G3333 | 5-REEL SLOTS | NONE | 2:00AM-3:00AM 7/9/04 | 2 PLAYERS WITH SIMULTANEOUS PAYOUTS > $100 SPLIT BONUS $2000 | $1 | N/A | P988889 AND P877778 SPLIT $2000 |
| S8888 | G4444 | VARIOUS | $100 FOR THE GROUP | SUNDAYS, 9/4/04-10/2/04, LIMIT 1 HOUR/DAY | GROUP WINS $1000 IF NUMBER OF PAYOUTS OVER $20 > 300 | $1 | N/A | IN PROCESS |

FIG. 10

214

| SESSION: S1122 1100 | GROUP MEMBERS 1102 | | | |
|---|---|---|---|---|
| | P222210 1104 | | P333321 1106 | |
| SPIN 1108 | OUTCOME 1110 | PAYOUT 1112 | OUTCOME 1114 | PAYOUT 1116 |
| 1 | BELL-BELL-LEMON | 0 | ORANGE-ORANGE-BAR | 10 |
| 2 | CHERRY-CHERRY-CHERRY | 20 | LEMON-BLANK-ORANGE | 0 |
| 3 | BAR-PLUM-7 | 0 | BELL-PLUM-ORANGE | 0 |
| N | ORANGE-BELL-CHERRY | 2 | 7-7-7 | 100 |
| | NET WINNINGS: -30 1118 | | NET WINNINGS: +45 1120 | |

FIG. 11

METHOD AND APPARATUS FOR LINKED PLAY GAMING

RELATED APPLICATIONS

The present application is a continuation of U.S. patent application Ser. No. 10/254,831, filed Sep. 25, 2002 in the name of Walker et at., entitled "METHOD AND APPARATUS FOR LINKED PLAY GAMING";

which application claims the benefit of priority of U.S. Provisional Patent Application Ser. No. 60/324,572, filed Sep. 25, 2001, entitled "Linked Play".

Each of the above-referenced applications is incorporated by reference herein in its entirety.

This application is related to commonly-owned, U.S. patent application Ser. No. 08/775,388, filed Dec. 30, 1996, entitled "Method and System for Adapting Gaming Devices To Playing Preferences," which issued as U.S. Pat. No. 6,110,041 on Aug. 29, 2000;

commonly-owned, U.S. patent applicaton Ser. No. 09/481,204, filed Jan. 11, 2000, entitled "Method and System for Adapting Gaming Devices To Playing Preferences," which issued as U.S. Pat. No. 6,293,866 B1 on Sep. 25, 2001;

commonly-owned, co-pending U.S. patent applicaton Ser. No. 09/962,065, filed Sep. 25, 2001, entitled "Method And System For Adapting Casino Games To Playing Preferences";

commonly-owned, U.S. patent applicaton Ser. No. 09/052,835, filed Mar. 31, 1998, entitled "Method and Apparatus For Team Play Of Slot Machines," which issued as U.S. Pat. No. 6,142,872 on Nov. 7, 2000;

commonly-owned, U.S. patent applicaton Ser. No. 09/590,021, filed Jun. 8, 2000, entitled "Method and Apparatus For Team Play Of Slot Machines", which issued as U.S. Pat. No. 6,361,441 B1 on Mar. 26, 2002;

commonly-owned, co-pending U.S. patent applicaton Ser. No. 10/067,576, filed Feb. 5, 2002, entitled "Apparatus And Method For Facilitating Team Play Of Slot Machines";

commonly-owned, U.S. patent applicaton Ser. No. 09/108,827, filed Jul. 1, 1998, entitled "Method and Apparatus For Team Play Of Slot Machines," which issued as U.S. Pat. No. 6,312,332 B1 on Nov. 6, 2001;

commonly-owned, co-pending U.S. patent applicaton Ser. No. 10/006,402, filed Oct. 23, 2001, entitled "Method And Apparatus For Team Play Of Slot Machines"; commonly-owned, U.S. patent applicaton Ser. No. 09/152,402, filed Sep. 14, 1998, entitled "System And Method For Facilitating Casino Team Play," which issued as U.S. Pat. No. 6,206,782 B1 on Mar. 27, 2001;

commonly-owned, co-pending U.S. patent applicaton Ser. No. 09/793,020, filed Feb. 26, 2001, entitled "System And Method For Facilitating Casino Team Play;";

commonly-owned, co-pending U.S. patent applicaton Ser. No. 10/190,722, filed Jul. 5, 2002, entitled "System And Method For Facilitating Casino Team Play";

commonly-owned, U.S. patent applicaton Ser. No. 09/108,646, filed Jul. 1, 1998, entitled "Electronic Amusement Device Offering Secondary Game Of Chance And Method For Operating Same", which issued as U.S. Pat. No. 6,364,765 B1 on Apr. 2, 2002;

commonly-owned, co-pending U.S. patent applicaton Ser. No. 10/029,143, filed Dec. 27, 2001, entitled "Electronic Amusement Device Offering Secondary Game Of Chance And Method For Operating Same"; all of which are incorporated herein by reference in their entirety for all purposes.

The present application is related to U.S. patent application Ser. No. 11/422,776 filed on Jun. 7, 2006 in the name of Walker et al, and entitled "METHOD AND APPARATUS FOR LINKED PLAY GAMING".

The present application is related to U.S. patent application Ser. No. 11/422,784 filed on Jun. 7, 2006in the name of Walker et al, and entitled "METHOD AND APPARATUS FOR LINKED PLAY GAMING".

The present application is related to U.S. patent application Ser. No. "10/254,831" (01-030-C4) filed on Sep. 25, 2002 in the name of Walker et al, and entitled "METHOD AND APPARATUS FOR LINKED PLAY GAMING".

The present application is related to U.S. patent application Ser. No. "10/254,831" (01-030-C5) filed on Sep. 25, 2002 in the name of Walker et al, and entitled "METHOD AND APPARATUS FOR LINKED PLAY GAMING".

FIELD OF THE INVENTION

The present invention relates to methods and apparatus for groups of people to play games together. More specifically, the present invention relates to facilitating linked gaming between two or more players.

BACKGROUND OF THE INVENTION

There are currently over 500,000 slot machines in operation that generate more than $15 billion in annual revenue for United States casinos. Most casinos generate more than half of their gaming revenues from slot machines and some individual casinos offer two or three thousand slot machines at a single location. In fact, two different casinos in Connecticut each provide over six thousand gaming devices for players.

Popular casino games such as craps and blackjack offer a social experience. In fact, one reason these games are popular is that people at the same table tend to win and lose together as a group. Such games create a team spirit, pitting the gamblers at the table against the casino. People enjoy such shared experiences and thus tend to travel to casinos in groups, such as a husband and wife, groups of co-workers, and groups of friends. In contrast to craps and blackjack however, for some players, slot machine gaming may be an isolating experience. What is needed are systems and methods that facilitate a more social experience while playing gaming devices, particularly for groups of players.

BRIEF DESCRIPTION OF THE DRAWINGS

FIG. 6 is a drawing illustrating an example of a third gaming device display screen as it may be used on a gaming device 104 according to some embodiments of the present invention.

FIG. 8 is a table illustrating an example data structure of an example user database 208 as depicted in FIG. 2 for use in some embodiments of the present invention.

FIG. 9 is a table illustrating an example data structure of an example group database 208 as depicted in FIG. 2 for use in some embodiments of the present invention.

FIG. 10 is a table illustrating an example data structure of an example group session database 208 as depicted in FIG. 2 for use in some embodiments of the present invention.

FIG. 11 is a table illustrating an example data structure of an example current session database 208 as depicted in FIG. 2 for use in some embodiments of the present invention.

DETAILED DESCRIPTION OF SOME EMBODIMENTS OF THE INVENTION

Figure 1A:
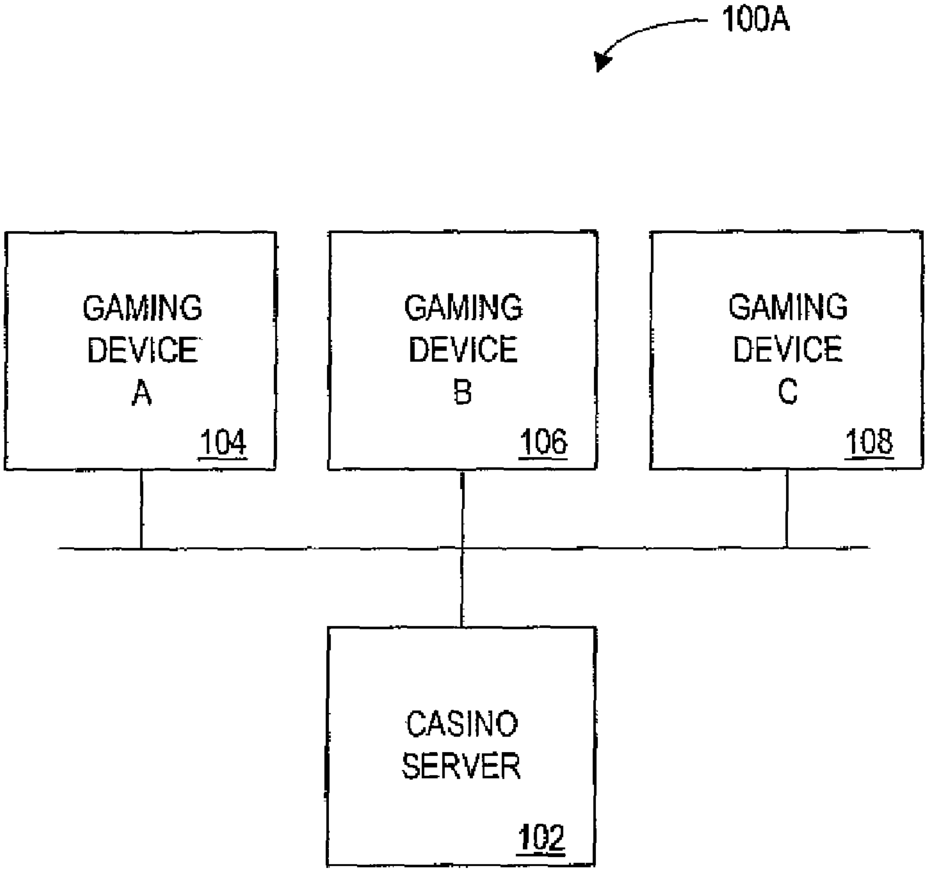
FIG. 1A is a block diagram illustrating an example system according to some embodiments of the present invention.

The disclosed invention overcomes the above and other drawbacks of the prior art by allowing people to gamble as a group against a casino or each other. In some embodiments of the present invention, group members' individual gambling outcomes are combined into a group outcome. The group outcome is then matched against a set of criteria for beating the casino. If the group outcome meets the set of criteria, then the group receives a reward. In some embodiments, the reward is provided to the whole group, whereas in other embodiments, the reward is shared only among particular group members. As the group members generate their individual outcomes, they may communicate with one another, sharing in the excitement or disappointment of each other's outcomes, and sharing advice for games with skill components. If the group wins, all members feel group satisfaction. Even if the group does not win, there are still the near misses to talk about. In any event, group competition provides casino patrons with a much more social experience than is typically had at a casino. Group play encourages people to remain at the casino until the group's competition has been completed. With group play, people will encourage more friends to accompany them to a casino so as to fill a group roster. The casino therefore benefits from increased gambling activity.

There are many possible group formats. Instead of competing together against the casino, group members may compete against one another. Two or more group members may make a bet as to who will have the best gambling results for a session. The casino holds the bets from each group member, and gives the bets to the group member who had the best performance at the end of the gambling session. Another group format links group members' outcomes in some way. For instance, if two group members both receive an outcome of "orange-orange-orange" at almost the same time, then the two group members win a bonus prize in addition to the payout for "orange-orange-orange". Still another group format allows all group members to share in each other's winnings and losses. With this format, group members mitigate the risk of sustaining large losses themselves and get to share in the luck of other group members. In yet another format, a group has its own progressive prize. Each group member's wagers contribute to the progressive prize and only group members are eligible to win the progressive prize. There are many other possible group formats.

Group play is applicable to gamblers at a casino and to remote gamblers playing on the Internet and/or via the telephone. Group play may be facilitated by a casino server. The casino server 102 receives user information from a gaming device, personal computer, or other input device. In addition, the casino server 102 receives information describing the groups the users would like to form or to join. The casino server 102 stores information about a group's format, including any entry fee group members are required to pay, the amount of money group members may be required to wager as part of the group, the length of the group's gambling session, and so on. The casino server 102 also stores information about the group's objective, including the criteria the group is required to satisfy in order to win a prize, and the nature of the prize itself. The casino server 102 may additionally store information about who belongs to a particular group. The casino server 102 may then track the gambling results of the individual group members, and aggregate the results into a group result or outcome. At the end of a group's gambling session, or at any appropriate point in time, the casino server 102 may determine whether the group or group members have met the group's objective, and if they have, may instruct group members' gaming devices to award prizes accordingly.

With these and other advantages and features of the invention that will become hereinafter apparent, the nature of the invention may be more clearly understood by reference to the following detailed description of the invention, the appended claims and to the several drawings included herein.

In the following description, reference is made to the accompanying drawings that form a part hereof, and in which is shown, by way of illustration, specific embodiments in which the invention may be practiced. These embodiments are described in sufficient detail to enable those skilled in the art to practice the invention, and it is to be understood that other embodiments may be utilized and that structural, logical, software, and electrical changes may be made without departing from the scope of the present invention. The following description is, therefore, not to be taken in a limited sense, and the scope of the present invention is defined by the appended claims.

Applicants have recognized that a need exists for systems and methods that provide users with a social experience while playing gaming devices. One particular benefit to users of embodiments of the present invention is that users are able to experience more interaction among people at a casino then they typically would playing conventional slot machines. This changes gambling, particularly gambling at slot machines, from an isolating experience into a dynamic social and exciting experience. Group play also provides opportunities to win much larger prizes than would otherwise be possible while at the same time, group play may allow people to reduce their risks of large losses and to share in the luck of others.

From a casino's perspective, the present invention provides a number of benefits. People who have joined a group are likely to gamble at a casino at least for the duration of the group's session. Therefore, groups provide a means for a casino to ensure receipt of a certain amount of customer business. In addition, awarding prizes for group performance provides an alternative channel for distributing casino hotel rooms, show tickets, meals, and merchandise. A casino may profitably give away to groups anything it cannot sell through standard channels. Further, people will encourage friends or relatives to accompany them to a casino so as to form a group. Casinos will therefore benefit from increased patronage. Also, group play increases people's enjoyment of gambling by adding elements of shared experience, team pride and/or competition. Thus, people who enjoy the experience of gambling are likely to gamble for longer periods of time when gambling in groups.

A. TERMS

Throughout the description that follows and unless otherwise specified, the following terms may include the meanings provided in this section. These terms and illustrative meanings are provided to clarify the language selected to describe embodiments of the invention both in the specification and in the appended claims.

The terms "products," "goods," "merchandise," and "services" shall be synonymous and may refer to anything licensed, leased, sold, available for sale, available for lease, available for licensing, and/or offered or presented for sale, lease, or licensing including packages of products, subscriptions to products, contracts, information, services, and intangibles.

The term "merchant" may refer to an entity who may offer to sell, lease, and/or license one or more products to a consumer (for the consumer or on behalf of another) or to other merchants. For example, merchants may include sales channels, individuals, companies, manufacturers, distributors, direct sellers, re-sellers, and/or retailers. Merchants may transact out of buildings including stores, outlets, malls, casinos, and warehouses, and/or they may transact via any number of additional methods including mail order catalogs, vending machines, online web sites, and/or via telephone marketing. Note that a producer or manufacturer may choose not to sell to customers directly and in such a case, a retailer may serve as the manufacturer's or producer's sales channel.

The terms "player" and "user" shall be synonymous and may refer to any person or entity that operates a user device, a gaming device, and/or a user terminal.

The term "gaming device" may refer to any electrical, mechanical, electro-mechanical and/or other device that may accept a wager, may follow a process to generate an outcome, and may pay winnings based on the outcome. The outcome may be randomly generated, as with a slot machine; may be generated through a combination of randomness and user skill, as with video poker; or may be generated entirely through user skill. A gaming device may include any gaming machine and/or system, including slot machines, video poker machines, video bingo machines, video roulette machines, video keno machines, video blackjack machines, arcade games, video games, pinball machines, skill crane machines, video lottery terminals, online gaming systems, sports betting machines, game consoles, personal computers logged into online gaming sites, etc. Gaming devices may or may not be owned and/or maintained by a casino and/or may or may not exist within a casino location.

The term "casino" may refer to the owner of gaming devices, owners' agents, and/or any entity who may profit from players' use of the gaming devices.

The term "casino location" may refer to the physical geographic site, complex, or building where gaming devices owned and/or operated by a casino are located. In the case of an online casino, casino location may refer to the address (e.g. the uniform resource locator (URL)) of the online casino's Web site or facility.

The terms "handle pull" and "spin" shall be synonymous and may refer to a single play at a gaming device. In some embodiments, a handle pull may refer to a single complete game (or hand) or in other embodiments, the term may refer to a play related to a single wager. For example, in video blackjack, a user might play a single game in which he splits a pair of sevens, requiring an additional wager. This single game may be considered to include either one or two handle pulls.

The terms "server" and "casino server" shall be synonymous and may refer to any device that may communicate with one or more one or more gaming devices, one or more third-party servers, one or more remote controllers, one or more player devices, and/or other network nodes, and may be capable of relaying communications to and from each.

The term "user terminal" and "remote controller" shall be synonymous and may refer to any device that may communicate with one or more casino servers, one or more gaming devices, one or more third-party service provider servers, one or more player devices, and/or other network nodes. User terminals may, for example, include personal computers, laptop computers, handheld computers, telephones, kiosks, automated teller machines, gaming devices, game consoles, and/or vending machines. They may include facilities to support secure communications using encryption or the like.

The terms "player device" and "user device" shall be synonymous and may refer to any device owned or used by a user or consumer capable of accessing and/or displaying online and/or offline content. Player devices may communicate with one or more casino servers, one or more gaming devices, one or more third-party service provider servers, one or more user terminals, and/or other network nodes. In some embodiments, player devices may, for example, include gaming devices, personal computers, personal digital assistants, point-of-sale terminals, point of display terminals, kiosks, telephones, cellular phones, automated teller machines (ATMs), pagers, and combinations of such devices.

The term "input device" may refer to a device that is used to receive an input. An input device may communicate with or be part of another device (e.g. a point of sale terminal, a point of display terminal, a user terminal, a server, a player device, a gaming device, a controller, etc.). Some examples of input devices include: a bar-code scanner, a magnetic stripe reader, a computer keyboard, a point-of-sale terminal keypad, a touch-screen, a microphone, an infrared sensor, a sonic ranger, a computer port, a video camera, a motion detector, a digital camera, a network card, a universal serial bus (USB) port, a GPS receiver, a radio frequency identification (RFID) receiver, a RF receiver, a thermometer, a pressure sensor, and a weight scale.

The term "output device" may refer to a device that is used to output information. An output device may communicate with or be part of another device (e.g. a gaming device, a point of sale terminal, a point of display terminal, a player device, a casino device, a controller, etc.). Possible output devices include: a cathode ray tube (CRT) monitor, liquid crystal display (LCD) screen, light emitting diode (LED) screen, a printer, an audio speaker, an infra-red transmitter, a radio transmitter.

The term "I/O device" may refer to any combination of input and/or output devices.

The term "frequent shopper card" may refer to a device that may be capable of identifying and/or storing information about a consumer/player who is a shopper. This information may include identifying information and shopping history information. The frequent shopper card may be machine readable, for example, by a POS terminal. According to some embodiments of the present invention, a frequent shopper card may store player and/or group membership and/or group format information.

The term "player tracking card" may refer to a device that may be capable of identifying and/or storing information about a consumer who is a casino player. Typically player tracking cards may be accessed by gaming devices and magnetic card readers operated by casino staff. The information stored on the player tracking card may include identifying information, as well as financial information, such as a number of gambling credits remaining. The card may be machine readable, for example, by a gaming device. According to some embodiments of the present invention, a player tracking card may store player and/or group membership and/or group format information.

The term "ATM card" may refer to a device that may be capable of identifying and/or storing information about a consumer/player who is a bank customer. This information may include identifying information and bank account information. The ATM card may be machine readable, for example, by an automated teller machine. According to some embodiments of the present invention, an ATM card may store player and/or group membership and/or group format information.

The term "gross winnings" may refer to a user's (or group's) total winnings for a session or time period, without regard to the amounts wagered during the session.

The term "net winnings" may refer to a user's (or group's) total winnings for a session or time period, less the total amount wagered during that time period.

The term "group format" may refer to a set of rules or guidelines a group and its members are required to follow to be eligible for a prize as a group member. The group format may include, for example, a specification of: the gaming devices at which group members are required to wager, the total amount of money group members are required to wager, the total amount of money group members are required to contribute to a common pool, the length of a group session, the number of people who may join the group, what happens if a group member leaves the group, and/or the way in which any prize will be distributed among the group members.

The term "group objective" may refer to a prize and a set of criteria a group may be required to meet in order to win the prize. The group objective may include a specification of some or all of the group format. Examples of the criteria may include: having the group's aggregate net winnings exceeding a certain threshold, having two or more group members attain an outcome simultaneously, having each person in the group win a certain amount, etc. In embodiments where group members compete with one another, the criteria may be criteria for each individual group member. For example, the criteria may include beating the other members of the group. Prizes, for example, may include cash, gambling tokens, discounted hotel rooms, discounted meals, discounted show tickets, free handle pulls at a gaming device, etc.

The terms "playing group," "linked group," "linked play group," and "play group" shall be synonymous and may refer to a group of people whose play at a physical or on-line casino is linked in some way. For example, the members of a group may be linked in that they have each agreed to split a prize if the group's gross winnings exceed a certain amount. In some embodiments, a playing group may form at the request of a user. Alternatively, a group may form when the casino server 102 prompts two or more users to join. In addition to having their gambling results intertwined, in some embodiments, playing group members may also communicate with one another and may participate in other group activities, such as group lunches, award ceremonies, and outings.

The terms "linked play session" and "group play session" shall be synonymous and may refer to any period of time or a number of handle pulls during which group members' outcomes count towards a group objective.

B. SYSTEM

Figure 2:
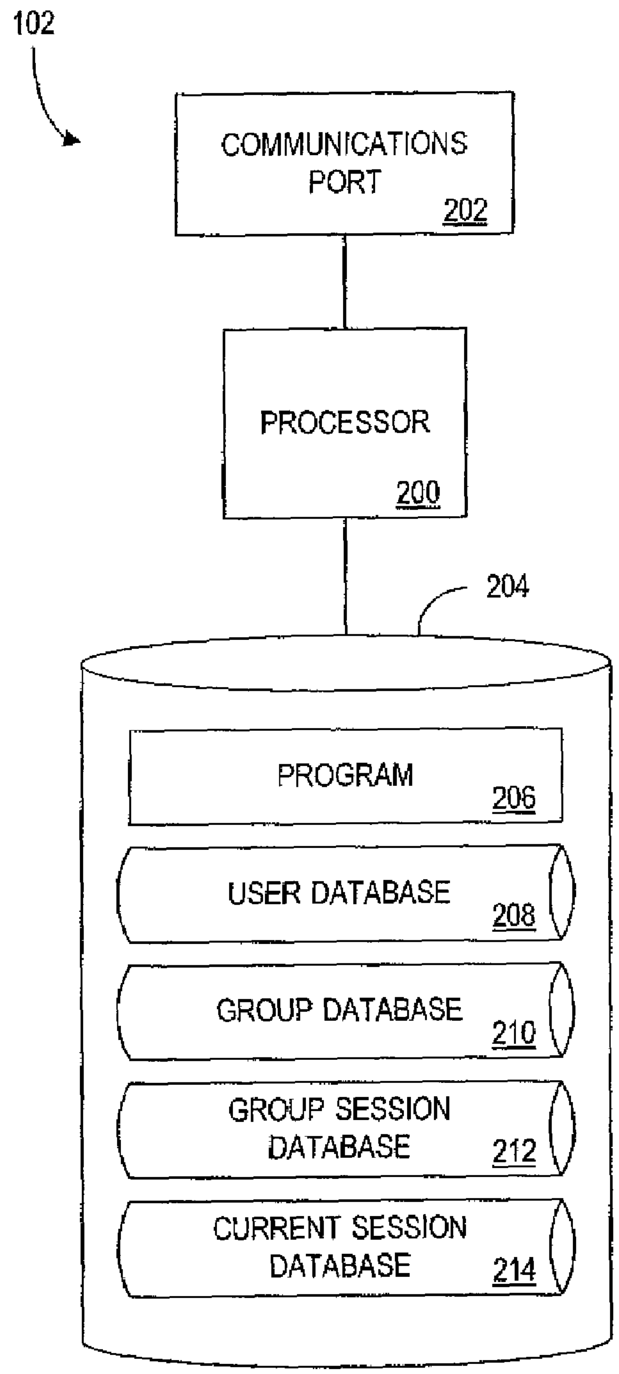
FIG. 2 is a block diagram illustrating an example of a casino server 102 as depicted in FIGS. 1A and 1B according to some embodiments of the present invention.
Figure 3:
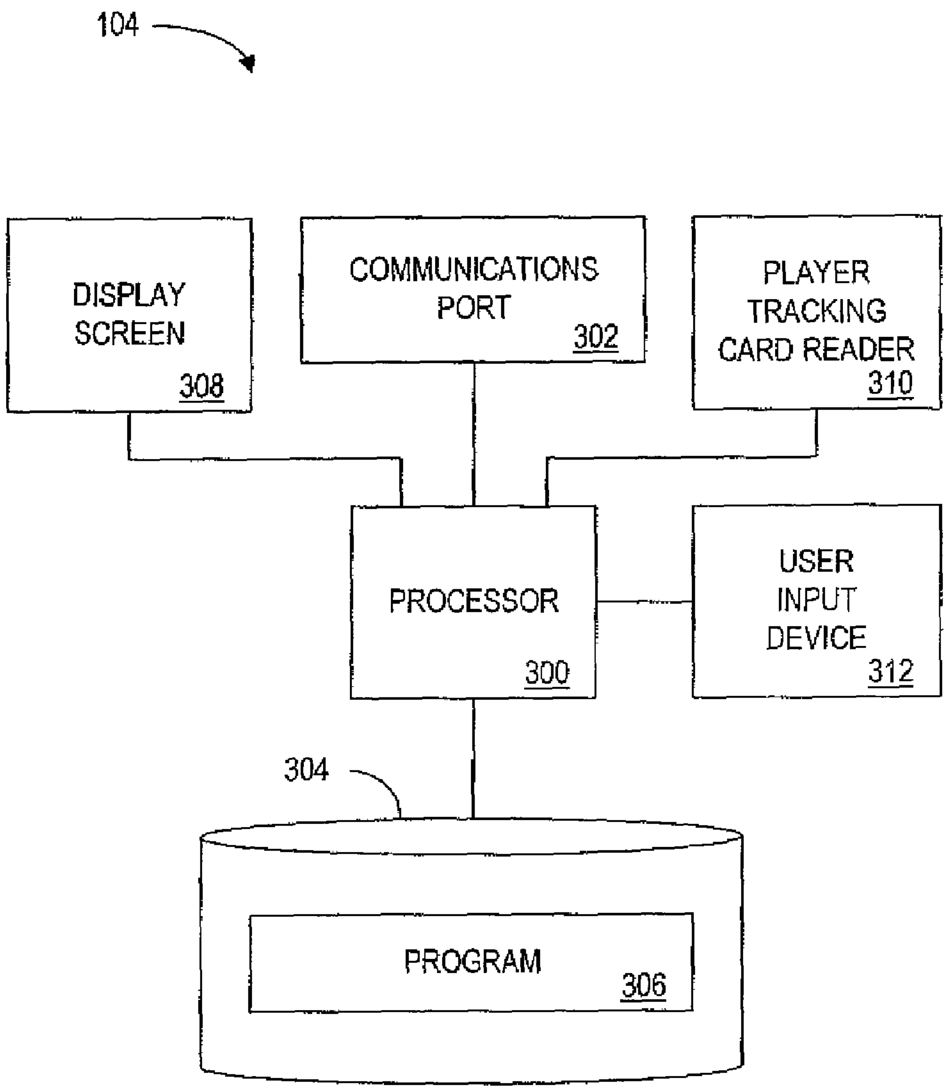
FIG. 3 is a block diagram illustrating an example of a gaming device 104 as depicted in FIGS. 1A and 1B according to some embodiments of the present invention.

An example embodiment of the system 100A of the present invention is depicted in FIG. 1A. The system 100A according to some embodiments of the present invention may include a casino server 102 (an example of which is depicted in FIG. 2) in one or two-way communication with one or more gaming devices 104, 106, 108 (an example of which is depicted in FIG. 3) via a network, for example, the Internet or via another communications link. Although not pictured, other casino devices besides gaming devices 104, 106, 108 may be connected to the casino server 102. Likewise, servers of other casinos and other establishments may be in direct or indirect communication with the casino server 102.

In operation, the casino server 102 may function under the control of a casino, a merchant, or other entity that may also control use of the gaming devices 104, 106, 108. For example, the casino server 102 may be a server in a merchant's network. In some embodiments, the casino server 102 may also be a merchant's server.

Figure 1B:
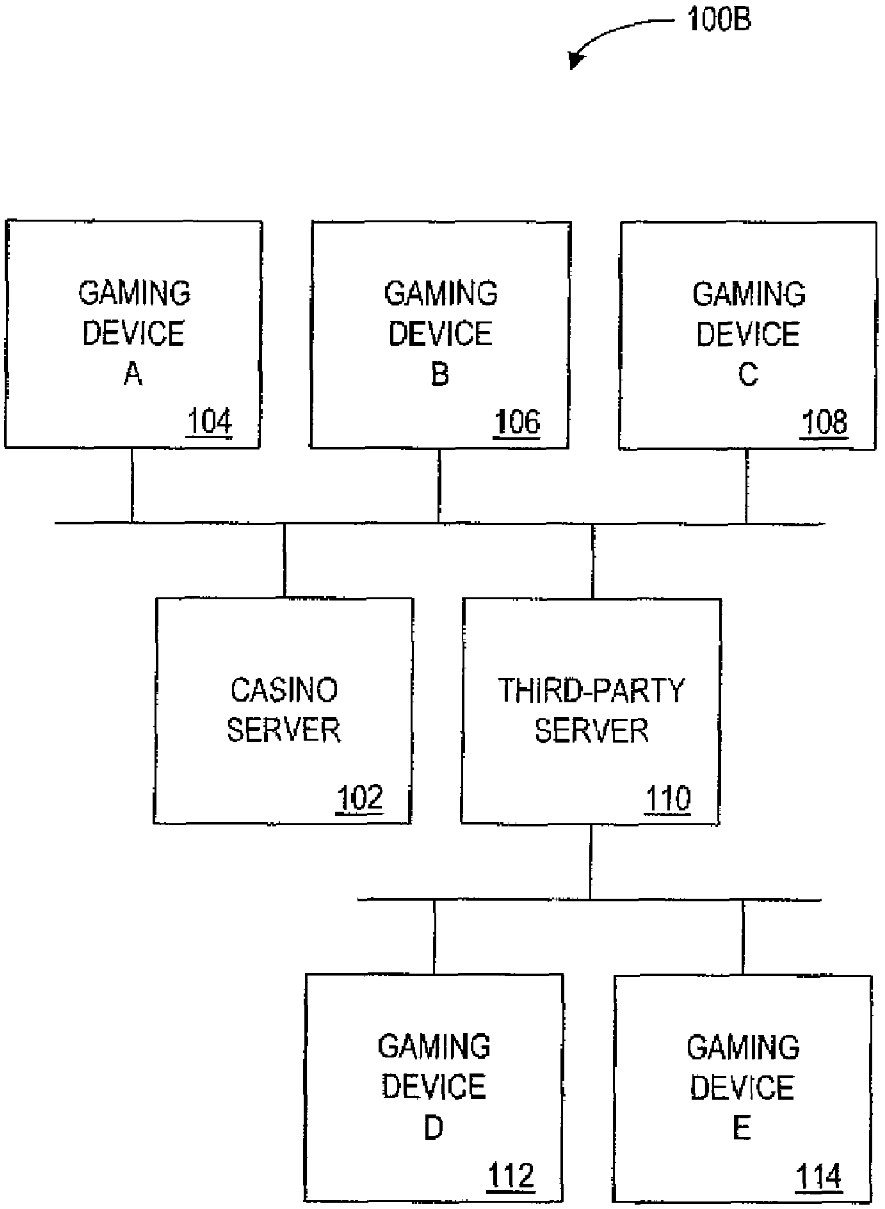
FIG. 1B is a block diagram illustrating an alternative example system according to some embodiments of the present invention.

Referring to FIG. 1B, an alternative system 100B according to some other embodiments of the present invention further includes one or more third-party servers 110. A third-party server 110 may also be in one or two-way communication with the casino server 102. However, as shown in the embodiment depicted in FIG. 1B, the third-party server 110 may be disposed between the casino server 102 and gaming devices 112, 114. Alternatively (not pictured), the third-party server 110 may be disposed between the casino server 102 and casino servers of other casinos.

The primary difference between the two alternative embodiments depicted in FIGS. 1A and 1B is that the embodiment of FIG. 1B includes the third-party server 110 which may be operable by an entity distinct and/or physically remote from the entity operating the casino server 102. In operation, the third-party server 110 may perform the methods of the present invention by sending signals to the casino server 102 to be relayed to the gaming devices 104, 106, 108. For example, a marketing company may operate the third-party server 110 to create gaming competitions or facilitate linked play on behalf of the casino in which a casino server 102 is used to control gaming devices 104, 106, 108. In the embodiment of FIG. 1A, the functions of the third-party server 110 may be consolidated into the casino server 102.

An additional difference between these two embodiments relates to the physical topology of the systems 100A and 100B. In both of the depicted embodiments, each node may securely communicate with every other node in the system 100A, 100B via, for example, a virtual private network (VPN). Thus, all nodes may be logically connected. However, the embodiment depicted in FIG. 1B allows the third-party server 110 to optionally serve as a single gateway between the nodes 102, 104, 106, 108 that will typically be under the control of a casino (and players within the casinos' location) and the other nodes in the system 100B, i.e. nodes 112, 114 that may be operated by players outside of the casinos' location. In some embodiments of the present invention, the centralization, security, and control that naturally results from this topology is useful in monitoring use of the system.

In both embodiments pictured in FIGS. 1A and 1B, communication between the casino server 102, the gaming devices 104, 106, 108, (112, 114), and/or the third-party server 110, may be direct and/or via a network such as the Internet.

Referring to both FIGS. 1A and 1B, each of the casino server 102, (the third-party server 110 of FIG. 1B), and the gaming devices 104, 106, 108, (112, 114) may comprise, for example, computers, such as those based on the Intel® Pentium® processor, that are adapted to communicate with each other. Any number of third-party servers 118, external casino servers (not pictured), and/or gaming devices 104, 106, 108, (112, 114) may be in direct or indirect, one or two-way communication with the casino server 102. The third-party server 110, the casino server 102, and/or the gaming devices 104, 106, 108, (112, 114) may each be physically proximate to each other or geographically remote from each other. The third-party server 110, the casino server 102, and/or the gaming devices 104, 106, 108, (112, 114) may each include input devices and output devices.

As indicated above, communication between the casino server 102, the third-party server 110, and the gaming devices 104, 106, 108, (112, 114) may be direct or indirect, such as over an Internet Protocol (IP) network such as the Internet, an intranet, or an extranet through a web site maintained by the casino server 102 (and/or the third-party server 110) on a remote server or over an online data network including commercial on-line service providers, bulletin board systems, routers, gateways, and the like. In some embodiments, the nodes may communicate with each other over local area networks including Ethernet, Token Ring, and the like, radio frequency communications, infrared communications, microwave communications, cable television systems, satellite links, Wide Area Networks (WAN), Asynchronous Transfer Mode (ATM) networks, Public Switched Telephone Network (PSTN), other wireless networks, and the like.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks or months at a time.

The casino server 102 (and/or the third-party server 110) may function as a "Web server" that presents and/or generates Web pages which are documents stored on Internet-connected computers accessible via the World Wide Web using protocols such as, e.g., the hyper-text transfer protocol ("HTTP"). Such documents typically include one or more hyper-text markup language ("HTML") files, associated graphics, and script files. A Web server allows communication with the casino server 102 in a manner known in the art. The gaming devices 104, 106, 108, (112, 114) may use a web browser, such as NAVIGATOR® published by NETSCAPE® for accessing HTML forms generated or maintained by or on behalf of the casino server 102 and/or the third-party server 110.

As indicated above, any or all of the casino server 102, the third-party server 110, and/or the gaming devices 104, 106, 108, (112, 114) may include or be part of, e.g., processor based cash registers, telephones, interactive voice response (IVR) systems such as the ML400-IVR designed by MISSING LINK INTERACTIVE VOICE RESPONSE SYSTEMS, cellular/wireless phones, vending machines, pagers, gaming devices including slot machines, personal computers, portable types of computers, such as a laptop computer, a wearable computer, a palm-top computer, a hand-held computer, a smart card, and/or a Personal Digital Assistant ("PDA"). Further details of the casino server 102, the third-party server 110, and the gaming devices 104, 106, 108, (112, 114) are provided below with respect to FIGS. 2 through 7.

As indicated above, in some embodiments of the invention, the casino server 102 (and/or the third-party server 110) may include gaming devices 104, 106, 108, (112, 114). In addition, the casino server 102 may communicate with users directly instead of through the gaming devices 104, 106, 108, (112, 114). Although not pictured, the casino server 102, the third-party server 110, and/or the gaming devices 104, 106, 108, (112, 114) may also be in communication with one or more consumer and/or merchant credit institutions to effect currency transactions and may do so directly or via a secure financial network such as the Fedwire network maintained by the United States Federal Reserve System, the Automated Clearing House (ACH) Network, the Clearing House Interbank Payments System (CHIPS), or the like.

In operation, the gaming devices 104, 106, 108, (112, 114) and/or the third-party server 110 may exchange information about the groups, linked play, and/or the individual group members via the casino server 102. In embodiments with a third-party server 110, the casino server 102 and/or the gaming devices 104, 106, 108, (112, 114) may exchange information about the groups, linked play, and/or the individual group members via the third-party server 110. The gaming devices 104, 106, 108, (112, 114) may for example, provide information related to group format selections and group objectives to the casino server 102 (and/or the third-party server 110). The gaming devices 104, 106, 108, (112, 114) may further provide gambling performance data to the casino server 102 (and/or the third-party server 110). The casino server 102 (and/or the third-party server 110) may provide information about group progress to the players at the gaming devices 104, 106, 108 in the casino location or to remote gaming devices 112, 114.

C. DEVICES

FIG. 2 is a block diagram illustrating details of an example of the casino server 102 of FIGS. 1A and 1B (and/or an example of a third-party server 110 of FIG. 1B). The casino server 102 is operative to manage the system 100A, 100B and execute the methods of the present invention. The casino server 102 may be implemented as one or more system controllers, one or more dedicated hardware circuits, one or more appropriately programmed general purpose computers, or any other similar electronic, mechanical, electromechanical, and/or human operated device. For example, in FIG. 1B, the casino server 102 is depicted as being in communication with a third-party server 110. In the embodiment of FIG. 1B, these two servers may provide the same functions as the casino server 102 alone in the embodiment of FIG. 1A.

The casino server 102 (and/or the third-party server 110) may include a processor 200, such as one or more Intel® Pentium® processors. The processor 200 may include or be coupled to one or more clocks or timers (not pictured) and one or more communication ports 202 through which the processor 200 communicates with other devices such as the gaming devices 104, 106, 108, (112, 114) and/or the third-party server 110. The processor 200 is also in communication with a data storage device 204. The data storage device 204 may include any appropriate combination of magnetic, optical and/or semiconductor memory, and may include, for example, additional processors, communication ports, Random Access Memory ("RAM"), Read-Only Memory ("ROM"), a compact disc and/or a hard disk. The processor 200 and the storage device 204 may each be, for example: (i) located entirely within a single computer or other computing device; or (ii) connected to each other by a remote communication medium, such as a serial port cable, a LAN, a telephone line, radio frequency transceiver, a fiber optic connection or the like. In some embodiments for example, the casino server 102 may comprise one or more computers (or processors 200) that are connected to a remote server computer operative to maintain databases, where the data storage device 204 is comprised of the combination of the remote server computer and the associated databases.

The data storage device 204 stores a program 206 for controlling the processor 200. The processor 200 performs instructions of the program 206, and thereby operates in accordance with the present invention, and particularly in accordance with the methods described in detail herein. The present invention may be embodied as a computer program 206 developed using an object oriented language that allows the modeling of complex systems with modular objects to create abstractions that are representative of real world, physical objects and their interrelationships. However, it would be understood by one of ordinary skill in the art that the invention as described herein can be implemented in many different ways using a wide range of programming techniques as well as general purpose hardware systems or dedicated controllers. The program 206 may be stored in a compressed, uncompiled and/or encrypted format. The program 206 furthermore may include program elements that may be generally useful, such as an operating system, a database management system and device drivers for allowing the processor 200 to interface with computer peripheral devices. Appropriate general purpose program elements are known to those skilled in the art, and need not be described in detail herein.

Further, the program 206 is operative to execute a number of invention-specific, objects, modules and/or subroutines which may include (but are not limited to) one or more routines to identify a player at a gaming device 104, 106, 108, (112, 114); one or more routines to receive information about a user; one or more routines to establish and to provide group objective and/or group format information to a user at a gaming device 104, 106, 108, (112, 114); one or more routines to form and register a group and associate players with the group; one or more routines to store group members' performance information; one or more routines to facilitate interaction among group members, one or more routines to facilitate and control communications between gaming devices 104, 106, 108, (112, 114) and/or a third-party server 110; one or more routines to terminate linked play; one or more routines to determine whether group objects were achieved and group formats were complied with; and/or one or more routines to control databases or software objects that track information regarding users, casinos, merchants supplying prizes, other third-parties, gambling results, group data, gaming devices 104, 106, 108, (112, 114), and awarding prizes. Examples of these routines and their operation are described in detail below in conjunction with the flowchart depicted in FIG. 12.

According to some embodiments of the present invention, the instructions of the program 206 may be read into a main memory of the processor 200 from another computer-readable medium, such from a ROM to a RAM. Execution of sequences of the instructions in the program 206 causes processor 200 to perform the process steps described herein. In alternative embodiments, hard-wired circuitry or integrated circuits may be used in place of, or in combination with, software instructions for implementation of the processes of the present invention. Thus, embodiments of the present invention are not limited to any specific combination of hardware, firmware, and/or software.

In addition to the program 206, the storage device 204 is also operative to store (i) a user database 208, (ii) a group database 210, (iii) a group session database 212, and (iv) a current session database 214. The databases 208, 210, 212, 214 are described in detail below and example structures are depicted with sample entries in the accompanying figures. As will be understood by those skilled in the art, the schematic illustrations and accompanying descriptions of the sample databases presented herein are exemplary arrangements for stored representations of information. Any number of other arrangements may be employed besides those suggested by the tables shown. For example, even though four separate databases are illustrated, the invention could be practiced effectively using one, two, three, five, or more functionally equivalent databases. Similarly, the illustrated entries of the databases represent exemplary information only; those skilled in the art will understand that the number and content of the entries can be different from those illustrated herein. Further, despite the depiction of the databases as tables, an object-based model could be used to store and manipulate the data types of the present invention and likewise, object methods or behaviors can be used to implement the processes of the present invention. These processes are described below in detail with respect to FIG. 12.

Turning to FIG. 3, a block diagram depicting an example a gaming device 104 may include a processor 300 coupled to a communications port 302, a data storage device 304 that stores a gaming device program 306, a display screen 308, a player tracking card reader 310, and/or a user input device 312. In embodiments in which, for example, the casino server 102 serves/controls multiple casinos operated by different entities, a casino may wish to have a local copy of the portions of the casino server's databases 208, 210, 212, 214 that include entries related to that casino and exclude other casinos' access to that casino's information. Thus, in some embodiments of a gaming device 104 according to the present invention there may be included local copies of some portions of the databases 208, 210, 212, 214. Such a redundant configuration may provide enhanced system performance by reducing network communications. A gaming device program 306 may include one or more routines to respond to requests from other gaming devices 106, 108, (112, 114) for group data and performance information. In other words, a local copy of a portion of the user database (not pictured) may provide the gaming device program 306 with access to information about specific players while the local copy of a portion of the group database (not pictured) may provide access to the group data. Such a distributed configuration may provide enhanced system security by allowing different casinos to store and maintain their own databases. In some embodiments, local copies of the databases are not stored on the gaming devices 104, 106, 108, (112, 114) and instead, the gaming device program 306 accesses the user database 208 and the group database 210 stored and maintained on the casino server 102. Likewise, in some embodiments, the databases may only exist on a third-party server 110 and thus, both the casino server 102 and the gaming devices 104, 106, 108, (112, 114) access the third-party server 110 for the data.

Figure 4:
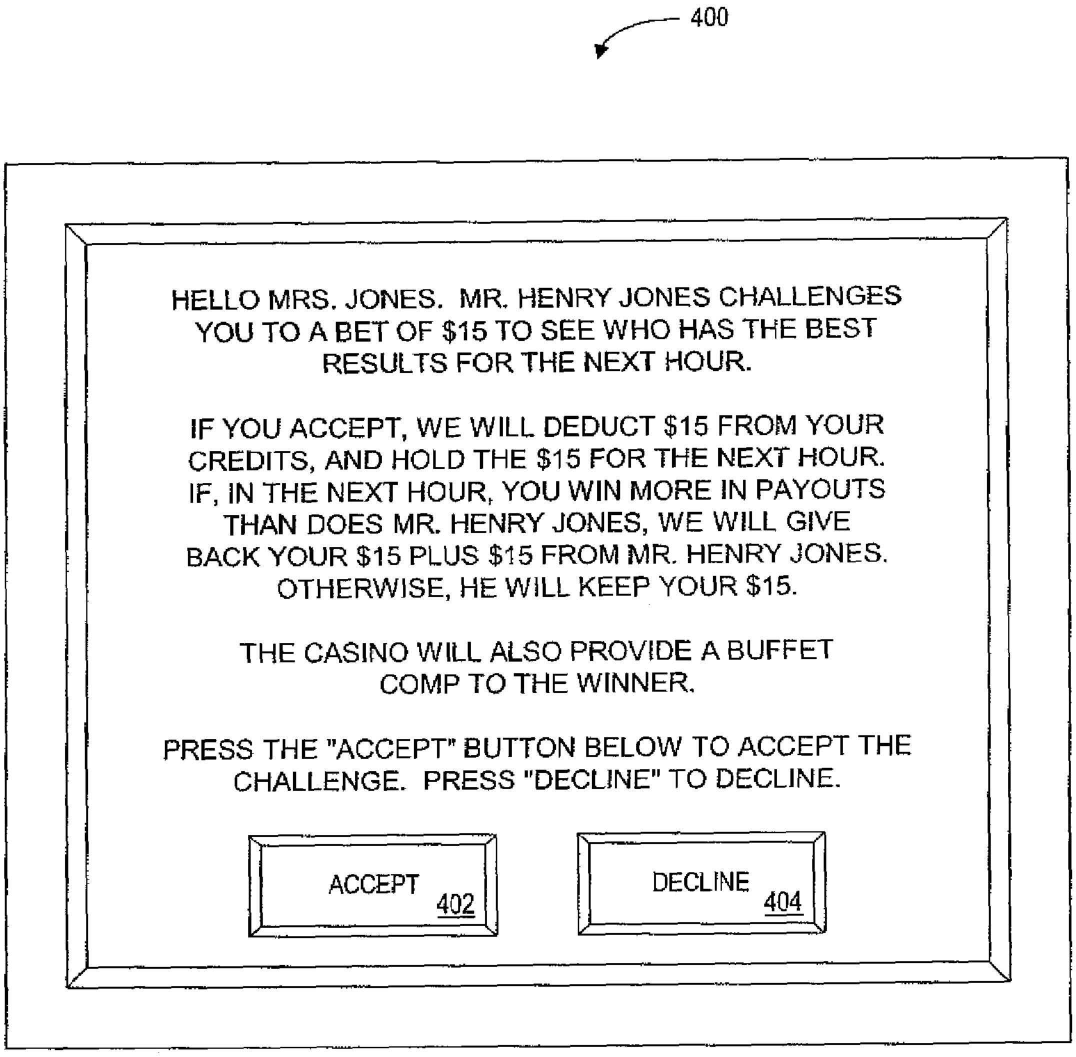
FIG. 4 is a drawing illustrating an example of a first gaming device display screen as it may be used on a gaming device 104 according to some embodiments of the present invention.

Turning to FIG. 4, an example embodiment of a "Competition Request" dialog box 400 as it may be displayed on the display screen 308 of a gaming device 104 is depicted. Using information from the user database 208 and upon detecting a suitable player at a gaming device 104 using a player tracking card reader 310, in some embodiments the gaming device 104 may display a dialog box 400 to a player that, for example, says:

Hello Mrs. Jones. Mr. Henry Jones challenges you to a bet of $15 to see who has the best results for the next hour. If you accept, we will deduct $15 from your credits, and hold the $15 for the next hour. If, in the next hour, you win more in payouts than does Mr. Henry Jones, we will give back your $15 plus $15 from Mr. Henry Jones.

Otherwise, he will keep your $15. The casino will also provide a buffet comp to the winner. Press the "Accept" button below to accept. Press "Decline" to decline.

The player may then simply select either the Accept button 402 or the Decline button 404 to indicate her choice. The gaming device 104 is further operative to communicate the player's selection back to the casino server 102 for storage in the group database 212. In some embodiments, a "Competition Request" dialog box 400 may be presented to users outside a casino location operating a user device and/or to users inside a casino location operating a gaming device 104 (or any appropriate casino device). In some embodiments, a "Competition Request" dialog box 400 may be implemented as a Web page generated and/or stored remotely but viewed locally via a Web browser. Such a Web page may be created by the casino server 102 program 206 and/or the gaming device 104 program 306. In some embodiments, a "Competition Request" dialog box 400 may be implemented as a program that executes locally on a user terminal and/or on a gaming device 104 (or any appropriate casino device).

Figure 5:
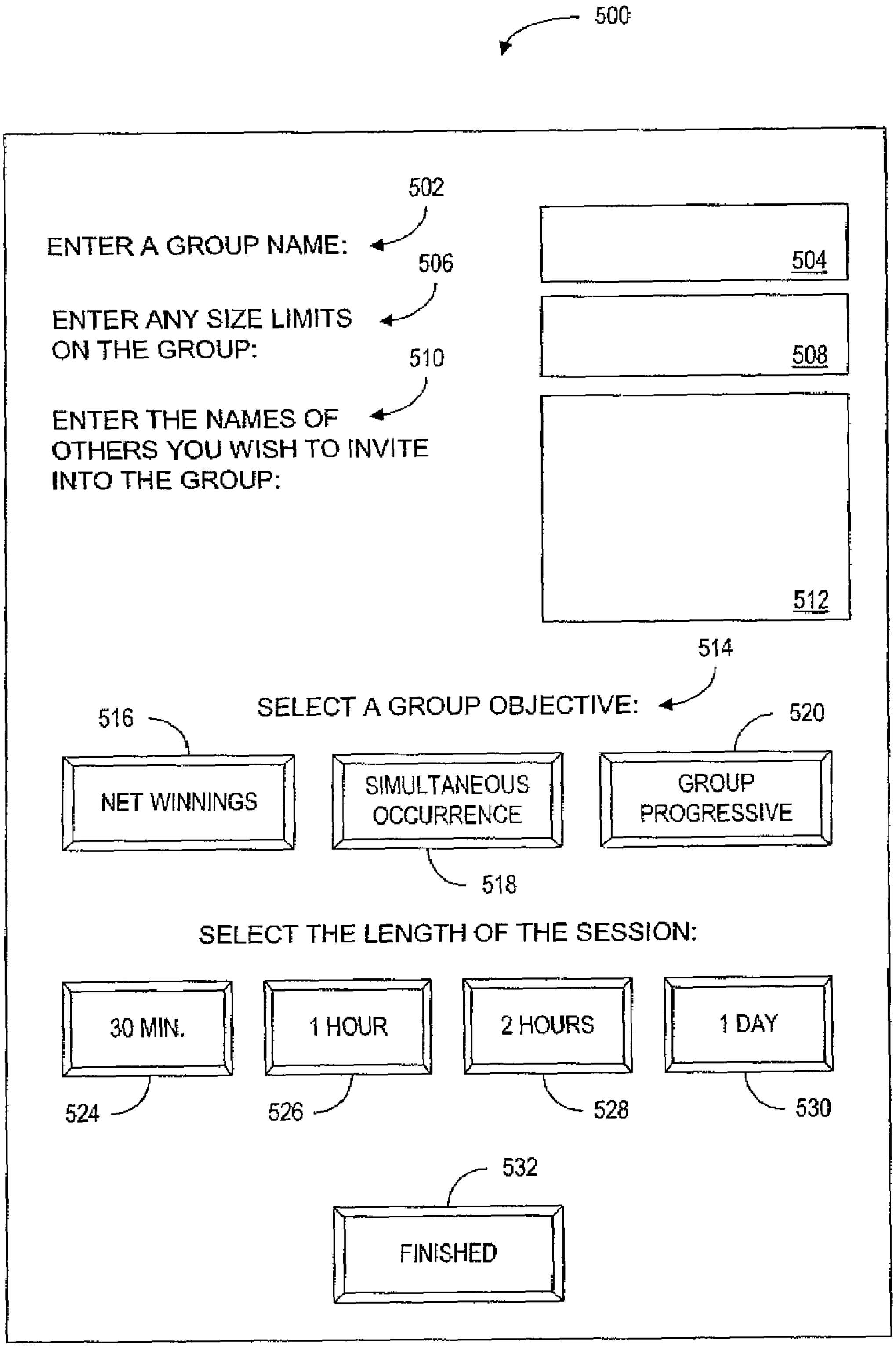
FIG. 5 is a drawing illustrating an example of a second gaming device display screen as it may be used on a gaming device 104 according to some embodiments of the present invention.

Turning to FIG. 5, an example embodiment of a "Create a Group for Linked Play" dialog box 500 as it may be displayed on the display screen 308 of a gaming device 104 is depicted. The particular example depicted allows a player, a casino, or a third party to enter information to register a group and choose a group objective and a group format. In the depicted embodiment, registering includes responding to a group name prompt 502 by completing a name input field 504, responding to a group size limit prompt 506 by completing a size input field 508, and responding to a potential members' names to invite prompt 510 by completing a members input field 512.

In this example, the group objective may be selected by activating one or more group objective buttons 516, 518, 520 in response to a group objective prompt 514. The "net winnings" group objective button 516 may be used to indicate to the system 100A, 100B that the group is to have the objective of achieving a certain amount of net winnings. The particular amount required by the casino to win a prize may be determined by the system 100A, 100B based upon the number of players in the group and the length of the linked play session.

The "simultaneous occurrence" group objective button 518 may be used to indicate to the system 100A, 100B that the group is to have the objective of generating a number of identical or associated outcomes within a defined time period or number of handle pulls. Again, the particular number of simultaneous associated outcomes required by the casino to win a prize may be determined by the system 100A, 100B based upon the number of players in the group and the length of the linked play session.

The "group progressive" group objective button 520 may be used to indicate to the system 100A, 100B that a portion of each wager of each group member is to be set aside into a "group progressive prize" and some predefined rule is to be used to award the prize to a group member at the end of the linked play session. In some embodiments, for example, a group progressive prize may be used to fund the prize for the two group members who receive identical simultaneous outcomes or the player that contributes the most to the group's aggregate net winnings score.

In the particular example of FIG. 5, the linked play session length may be selected by activating one of the length buttons 524, 526, 528, 530 in response to the session length prompt 522. The user, casino, and or third-party may then select the Finished button 532 to signal the gaming device 104 to communicate the selections back to the casino server 102 for storage in the group database 212. In some embodiments, a "Create a Group for Linked Play" dialog box 500 may be presented to users outside a casino location operating a user device and/or to users inside a casino location operating a gaming device 104 (or any appropriate casino device). In some embodiments, a "Create a Group for Linked Play" dialog box 500 may be implemented as a Web page generated and/or stored remotely but viewed locally via a Web browser. Such a Web page may be created by the casino server 102 program 206 and/or the gaming device 104 program 306. In some embodiments, a "Create a Group for Linked Play" dialog box 500 may be implemented as a program that executes locally on a user terminal and/or on a gaming device 104 (or any appropriate casino device).

Turning to FIG. 6, an example of a "simultaneous occurrence" payout table 600 as it may be displayed on the display screen 308 of a gaming device 104 is depicted. Such a payout table 600 may be used to indicate the potentially large group payouts available to group members who are engaged in linked play with an objective of receiving simultaneous associated outcomes. The particular example table 600 shown includes five columns: (i) an outcome on first device column 602 that specifies a first outcome; (ii) a payout for outcome on first device alone column 604 that specifies the number of tokens awarded for generating the outcome specified in the first column; (iii) an outcome on second device column 606 that specifies a second outcome; (iv) a payout for outcome on second device alone column 608 that specifies the number of tokens awarded for generating the outcome specified in the third column; and (v) a payout for simultaneous occurrence for the two outcomes column 610 that specifies the number of tokens awarded for two players independently and simultaneously generating one each of the two outcomes specified in the first and third columns.

This type of payout table 600 thus may be used to indicate associations between outcomes of different machines. For example, row one creates an association between an "orange-orange-orange" outcome on a reel slot machine with a "four of a kind" outcome on a video poker machine. According to the example data in the first row, if two linked players, one playing a reel slot machine and the other playing a video poker machine, simultaneously receive an orange-orange-orange outcome and a four of a kind outcome respectively, a payout of 200 tokens will be awarded. In some embodiments, where players may use the same type of machine, the group objective may be to receive simultaneous identical outcomes.

Figure 7:
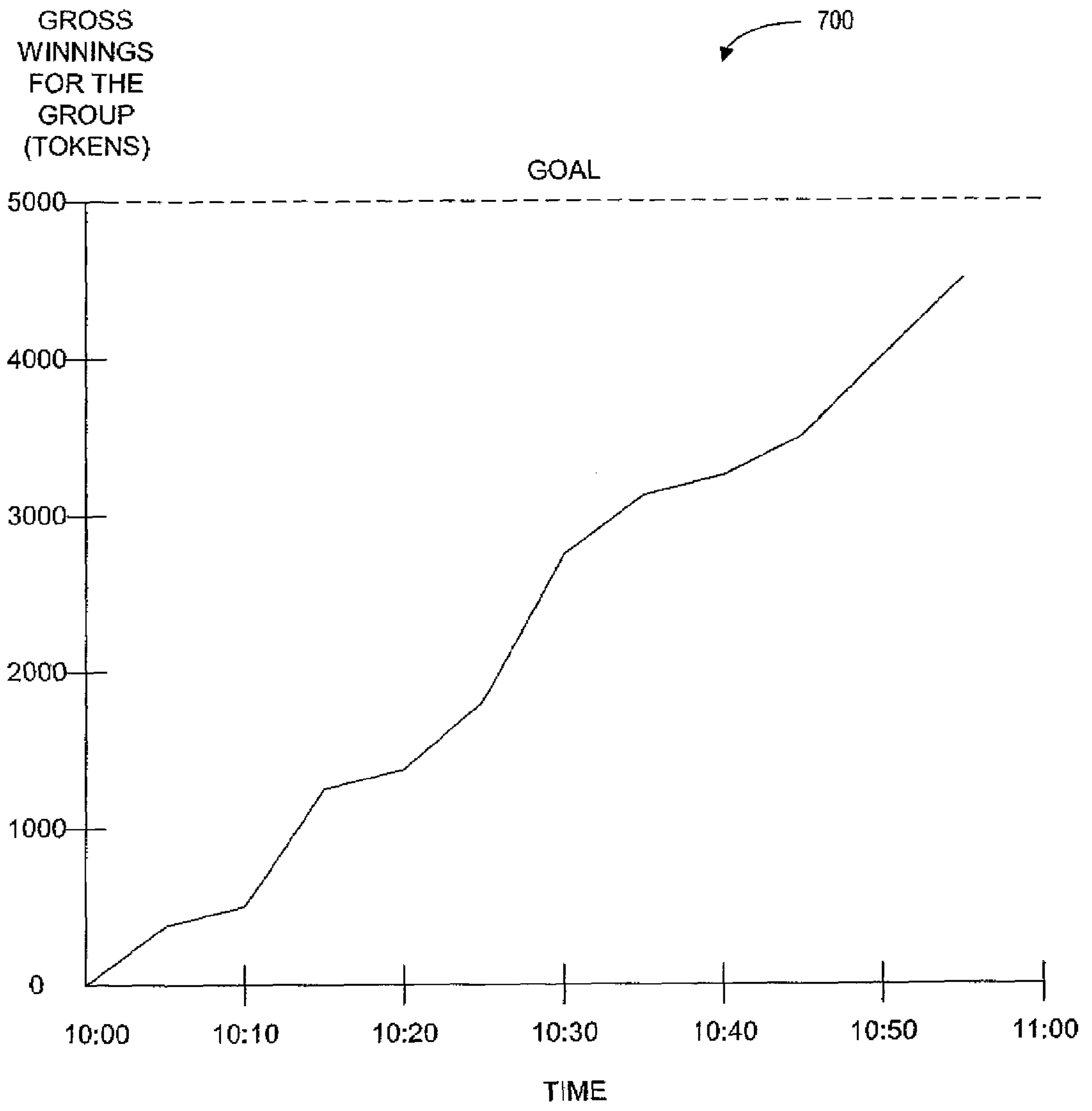
FIG. 7 is a drawing illustrating an example of a fourth gaming device display screen as it may be used on a gaming device 104 according to some embodiments of the present invention.

Turning to FIG. 7, an example of a group objective progress graph 700 as it may be displayed on the display screen 308 of a gaming device 104 is depicted. Such a progress graph 700 may be used to illustrate group results to individual group members engaged in linked play with an objective of achieving an aggregate gross winnings threshold within a defined time period. The particular example graph 700 shown indicates that if the group can maintain their current pace of winnings for the final five minutes of the linked play session, they will achieve the goal amount and thus qualify for a group prize. Providing such a representation to a linked play group may inspire the members to maintain or increase their pace of wagering to ensure that the group objective is met. Many alternative graphs, including alternative parameters such as group net winnings vs. handle pulls, may be used depending on the group's objective and/or format.

D. DATABASES

As indicated above, it should be noted that although the example embodiment depicted in FIG. 2 includes four particular databases stored in storage device 204, other database arrangements may be used which would still be in keeping with the spirit and scope of the present invention. In other words, the present invention could be implemented using any number of different database files or data structures, as opposed to the four depicted in FIG. 2. Further, the individual database files could be stored on different servers (e.g. located on different storage devices in different geographic locations, such as on a third-party server 110). Likewise, the programs 206, 306 could also be located remotely from the storage devices 204, 304 and/or on another server. As indicated above, the programs 206, 306 may include instructions for retrieving, manipulating, and storing data in the databases 208, 210, 212, 214, as may be useful in performing the methods of the invention as will be further described below.

1. User Database

Turning to FIG. 8, a tabular representation of an embodiment of a user database 208 according to some embodiments of the present invention is illustrated. This particular tabular representation of a user database 208 includes three sample records or entries which each include information regarding a particular user. In some embodiments of the invention, a user database 208 is used to track such things as player identity, player financial account information, player demographic information, and player gambling performance information, as well as linked play preference information. Those skilled in the art will recognize that such a user database 208 may include any number of entries or additional fields.

The particular tabular representation of a user database 208 depicted in FIG. 8 includes eight fields for each of the entries or records. The fields may include: (i) a player tracking card number field 800 that stores a representation uniquely identifying the user; (ii) a name field 802 that stores a representation of the user's name; (iii) a financial account identifier field 804 that stores a representation of a bank account number, a credit card number, or other financial account information needed to charge an account; (iv) a home address field 806 that stores a representation of the player's home address; (v) an email address field 808 that stores a representation of the player's email address; (vi) a demographic field 810 that stores a representation of a description of demographic information about the user; (vii) a desired group characteristics field 812 that stores a representation of a description of group characteristics that the player desires in a group that he would consider joining; and (viii) a lifetime theoretical win field 814 that stores a representation of the user's lifetime theoretical win.

The example user database 208 depicted in FIG. 8 provides example data to illustrate the meaning of the information stored in this database embodiment. A tracking card number 800 (e.g. "P11123," "P222234," "P333345") may be used to identify and index the players listed in the user database 208. Three examples of player information are provided. "Sam Brown" with credit card number "1111-1111-1111-1111" is a "male, age 23" who lives at "Anyplace, USA," has the email address "sbrown@rain.com" and has a lifetime theoretical win of "$2345," is interested in joining groups with "quarter slot players." "Linda Jones" with bank account number "2222-2222-2222-2222" is a "female, age 47" who lives at "Someplace, USA," has the email address "ljones@shine.com" and has a lifetime theoretical win of "$765," is only interested in being in a "group with only P444444." "Margie Smith" with credit card number "3333-3333-3333-3333" is a "female, age 65" who lives at "Anywhere, USA," has an email address "margie@east.com" and has a lifetime theoretical win of "$6100," is interested in joining a group that includes females over 55."

2. Group Database

Turning to FIG. 9, a tabular representation of an embodiment of a group database 210 according to some embodiments of the present invention is illustrated. This particular tabular representation of a group database 210 includes four sample records or entries which each include information regarding a group registered for linked play. In some embodiments of the invention, a group database 210 is used to track such things as group members' identity, the relationship or commonality among members, and the group sessions, as well as to associate individual players with their groups. Those skilled in the art will recognize that such a group database 210 may include any number of entries or additional fields.

The particular tabular representation of a group database 210 depicted in FIG. 9 includes four fields for each of the entries or records. The fields may include: (i) a group identifier field 900 that stores a representation uniquely identifying the group; (ii) a group members list field 902 that stores a representation listing the members of the group, wherein the members are represented by player tracking card numbers that may serve as pointers into the user database 208 depicted in FIG. 8 and discussed above; (iii) a common characteristics field 904 that stores a representation of the relationship or commonality among members of the group; and (iv) a group sessions field 906 that stores a representation listing the linked play sessions the group has played or will play, wherein the linked play sessions are represented by session identifiers that may serve as pointers into the group session database 212 depicted in FIG. 10 and discussed below.

The example group database 210 depicted in FIG. 9 provides example data to illustrate the meaning of the information stored in this database embodiment. Referring to the first record, group "G1111" includes players "P222210, P333321" who are members of the "same family" and have participated in three group sessions: "S1122, S2233, S3344." Referring to the second record, group "G2222" includes players "P444432, P555543, P666654, P777765, P888876" who are "women from Ohio" and have participated in one group session: "S2211." Referring to the third record, group "G3333" includes players "P988889, P877778, P766667" who are "friends" and have participated in four group sessions: "S3333, S4444, S5555, S6666." Referring to the fourth record, group "G4444" includes players "P100001, P200002, P300003 . . . P900009" who have no common characteristics and have participated in two group sessions: "S7777, S8888."

3. Group Session Database

Turning to FIG. 10, a tabular representation of an embodiment of a group session database 212 according to some embodiments of the present invention is illustrated. This particular tabular representation of a group session database 212 includes four sample records or entries which each include information regarding an individual group play session. In some embodiments of the invention, a group session database 212 is used to track information descriptive of the participating group (or groups), the game played, any entry fees, the time of play, the group's objective, and results. Those skilled in the art will recognize that such a group session database 212 may include any number of entries or additional fields.

The particular tabular representation of a group session database 212 depicted in FIG. 10 includes nine fields for each of the entries or records. The fields may include: (i) a session identifier field 1000 that stores a representation uniquely identifying a particular group play session; (ii) a group identifier field 1002 that stores a representation of the group playing the session wherein the groups are identified using the same identifiers used in the group database 210 of FIG. 9; (iii) a game field 1004 that stores a representation of a description of the game(s) played by the group during the session; (iv) an entry fee field 1006 that stores a representation of the fee charged to participate in the session; (v) a session field 1008 that stores a representation of the times and dates of the session; (vi) an objective field 1010 that stores a representation of a description of group objective; (vii) a wager amount field 1012 that stores a representation of the size of the wager per handle pull that players are required to bet; (viii) a prize structure field 1014 that stores a representation of a description of one or more prizes to be awarded to specified group members if the group objective is met; and (ix) a result field 1016 that stores a representation of the groups' results.

The example group database 212 of FIG. 10 provides example data to illustrate the meaning of the information stored in this database embodiment. A session identifier 1000 (i.e. "S1122," "S2211," "S3333," "S8888") may be used to identify and index linked play sessions. Referring to the first sample entry, Group "G1111" (which we happen to know consists of two members of the same family from the first entry in the group database 210) paid "$20 each" as an entry fee to play "3-reel slots" competing to achieve the "highest net winnings" during "10:00AM-12:00PM 5/9/04" on "$1" per wager machines. "P333321 won 1st" prize which was "$39," the entry fee less one dollar.

Referring to the second sample entry, Group "G2222" (which we happen to know consists of five women from Ohio based on the second entry in the group database 210) paid no entry fee to play "video poker" competing to achieve the "most skillful play" during "3:30PM-5:30PM 6/12/04 [but] limit[ed to] 50 minutes/hour" on "$0.25" per wager machines. "P555543 won 1st"" prize which was a "free dinner" and "P666654 won 2nd" prize which was a "free lunch."

Referring to the third sample entry, Group "G3333" (which we happen to know consists of three friends according to the third entry in the group database 210) paid no entry fee to play "5-reel slots" attempting to achieve "2 players with simultaneous payouts>$100" during "2:00AM-3:00AM 7/9/04" on "$1" per wager machines. The objective was achieved and "P988889 and P877778 split $2000."

Referring to the fourth sample entry, Group "G4444" paid an entry fee of "$100 for the group" to play "various" games attempting to achieve an objective wherein the "group wins $1000 if [the] number of payouts over $20>300" during sessions held "Sundays, 9/4/04-10/2/04, limit[ed to] 1 hour/day" on "$1" per wager machines. Group "G4444" is "in process" attempting to achieve the objective.

4. Current Session Database

Turning now to FIG. 11, a tabular representation of an embodiment of a current session database 214 according to some embodiments of the present invention is illustrated. This particular tabular representation of a current session database 214 includes sample records or entries which each include information regarding the details of a particular spin in a linked play session. In some embodiments of the invention, a current session database 214 may be used by a casino to store each and every outcome and payout amount of each player in a group engaged in an active linked play session. Those skilled in the art will recognize that such a current session database 214 may include any number of entries or additional fields.

The particular tabular representation of a current session database 214 depicted in FIG. 11 includes five fields for each of the entries or records. In addition, the embodiment depicted includes three summary fields. The fields may include: (i) a spin field 1108 that stores a representation uniquely identifying a handle pull; (ii) a first player outcome field 1110 that stores a representation that is descriptive of the first player's outcome for the particular handle pull; (iii) a first player payout field 1112 that stores a representation of the amount the particular handle pull paid the first player; (iv) a second player outcome field 1114 that stores a representation that is descriptive of the second player's outcome for the particular handle pull; and (v) a second player payout field 1116 that stores a representation of the amount the particular handle pull paid the second player. Those skilled in the art will recognize that additional fields may be added to accommodate additional group members but that the sample data used in this particular example only required fields for a two-member group. The summary fields may include (i) a session field 110 that stores a representation that uniquely identifies the session; (ii) a group members field 1102 that includes sub-fields 1104, 1106 that provide a break-out of the identifiers of individual group members' player tracking card numbers; and (iii) net winnings fields for each player 1118, 1120 that each store a representation of a running total of the respective player's current net winnings in the session.

The example current session database 214 depicted in FIG. 11 provides example data to illustrate the meaning of the information stored in this database embodiment. A session field 1100 (e.g. S1122) may be used to identify the particular linked play session being recorded. The outcomes 1110, 1114 (e.g. Bell-Bell-Lemon, Cherry-Cherry-Cherry, Bar-Plum-7, Orange-Bell-Cherry; Orange-Orange-Bar, Lemon-Blank-Orange, Bell-Plum-Orange, 7-7-7) and the respective payout amounts 1112, 1116 (e.g. 0, 20, 0, 2; 10, 0, 0, 100) are listed in columns under the group members 1102 player tracking card numbers (e.g. P222210, P333321). Each row of outcomes 1110, 1114 and respective payout amounts 1112, 1116 may be enumerated and indexed by a spin number 1108 (e.g. 1, 2, 3, N). The net winnings fields 1118, 1120 (e.g. –30, 45) reflect the current running total net winnings (or loses) of the group member 1102 column under which the respective net winnings field appears. Thus, after N handle pulls, group member P222210 has lost 30 tokens and group member P333321 has won 45 tokens.

E. PROCESS DESCRIPTIONS

The system discussed above, including the hardware components and the databases, are useful to perform the methods of the invention. However, it should be understood that not all of the above described components and databases are necessary to perform any of the present invention's methods. In fact, in some embodiments, none of the above described system is required to practice the invention's methods. The system described above is an example of a system that would be useful in practicing the invention's methods. For example, the user database 208 described above with respect to FIG. 8 is useful for tracking users and information about them, but it is not absolutely necessary to have such a database in order to perform the methods of the invention. In other words, the methods described below may be practiced using a conventional player tracking list in conjunction with a casino's conventional accounting system.

Figure 12:
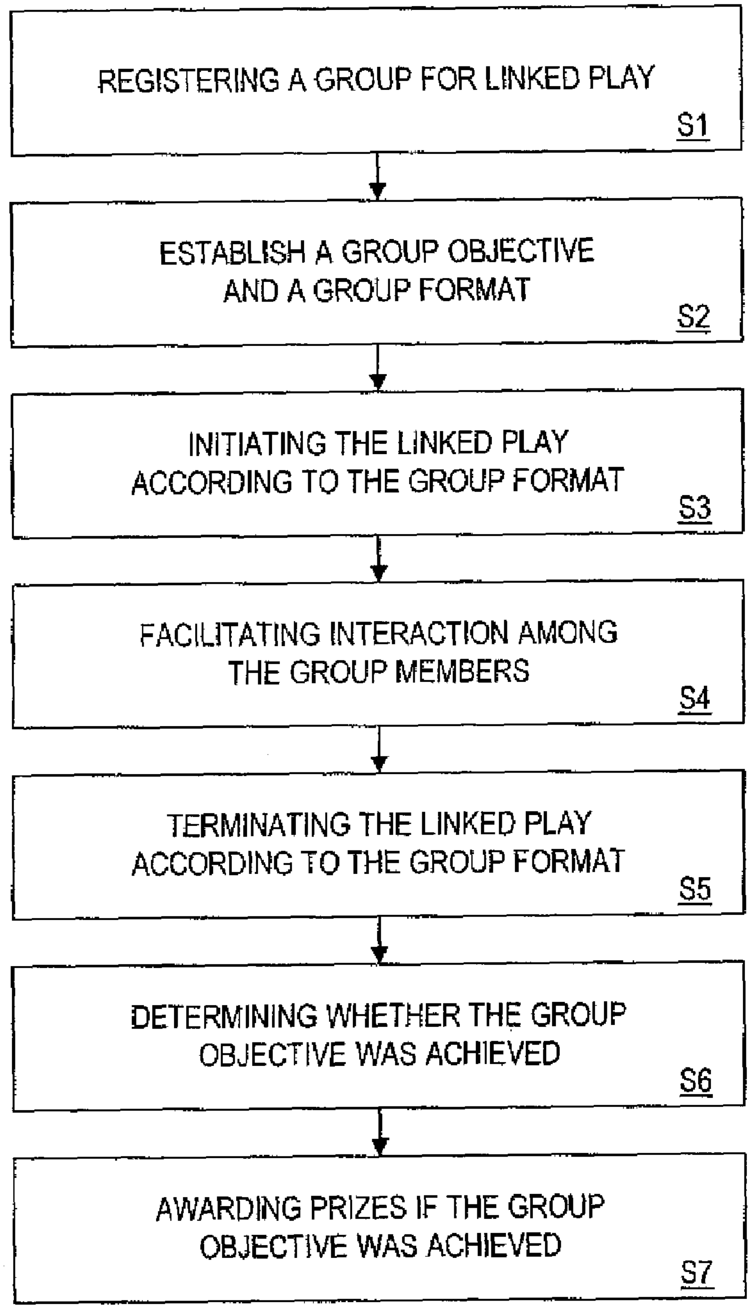
FIG. 12 is a flow diagram illustrating an exemplary process for facilitating linked play gaming according to and for use in some embodiments of the present invention.

Referring to FIG. 12, a flow chart is depicted that represents some embodiments of the present invention that may be performed by the casino server 102 (FIGS. 1A and 1B), the casino, an external third-party, and/or an integrated third-party entity/device such as a third-party server 110. It must be understood that the particular arrangement of elements in the flow chart of FIG. 12, as well as the order of example steps of various methods discussed herein, is not meant to imply a fixed order, sequence, and/or timing to the steps; embodiments of the present invention can be practiced in any order, sequence, and/or timing that is practicable.

In general terms and referring to FIG. 14, method steps of an embodiment of the present invention may be summarized as follows. In Step S1, a casino server 102 registers a group for linked play. In Step S2, a group objective and a group format are established. In Step S3, the linked play according to the group format is initiated on the gaming devices 104, 106, 108, (112, 114). In Step S4, the casino server 102, or another device, facilitates interaction between the group members. In Step S5, the linked play is terminated according to the group format. In Step S7, a determination is made by the casino server 102 whether the group objective has been achieved and in Step S8, prizes are awarded via the gaming devices 104, 106, 108, (112, 114) if the group objective was achieved.

In the subsections that follow, each of these steps will now be discussed in greater detail. Note that not all of these steps are required to perform the method of the present invention and that additional and/or alternative steps are also discussed below. Also note that the above general steps represent features of only some of the embodiments of the present invention and that they may be combined and/or subdivided in any number of different ways so that the method includes more or fewer actual steps. For example, in some embodiments many additional steps may be added to update and maintain the databases described above, but as indicated, it is not necessary to use the above described databases in all embodiments of the invention. In other words, the methods of the present invention may contain any number of steps that are practicable to implement the processes described herein.

1. Registering A Group For Linked Play

In Step S1, a group is formed and in some embodiments, the members are registered with the casino server 102. A playing group may be any group of people whose gambling results are linked in some way. For example, each member of a group of five people may agree to share equally in the winnings or the losses of the group as a whole. If, at the end of a gambling session, the group members have won $500 between them, then each member receives $100. In another example, each member of a playing group may win a large prize if at least two group members achieve the outcome "orange-orange-orange" within 30 seconds of one another. In a third example, each member of a playing group contributes $10 to a common pool at the beginning of a gambling session. At the end of the session, the group member who has won the most gambling wins the common pool of money. In all of these examples, the money a group member ultimately wins is influenced by the gambling performances of other group members, and thus, the play is linked.

A typical playing group might include people with a pre-existing relationship. A playing group might include a husband and wife, several college friends, people belonging to the same business group, and so on. In some embodiments, a group could just as well include people who do not know each other. However, even members of a group of strangers might share common characteristics. For example, each might be in a similar age group, each might be of the same gender, or each might prefer to gamble at a particular type of slot machine.

The formation of a playing group may begin when one or more prospective members communicates to the casino server 102 the desire to form a playing group. Group members may communicate with the casino server 102 via a gaming device 104 with a network connection to the server 102. Group members may come to a slot club booth, an information center, or a chip-cashing desk at a casino and inform a casino employee of the desire to register a group. The casino employee may then communicate with the casino server 102 via casino device such as a user terminal on the group's behalf A group may also register on-line. For example, one or more group members may use a personal computer to access a Web site hosted by the casino server 102. The group member(s) may then provide registration information by keying it into dialog boxes on the Web site, by selecting relevant options from menus, and so on. A group may also register over the phone with an operator or an IVRU, via email, or via any other method. FIG. 5 depicts a sample form which a user, a casino, and/or a third-party may use to initiate the formation of a group. Such a form may be displayed on the display screen 308 of a gaming device 104, or on a Web page hosted by the casino server 102. As discussed in detail above, the form may include prompts and input fields for entering various parameters pertaining to a group's format and objective.

The casino server 102 may require registration information from a playing group and its members. Registration information might include group members' names, addresses, telephone numbers, email addresses, financial account information, player tracking card numbers, demographics, marital status, number of children, gambling preferences, and so on. Information about playing group members may be stored in a user database 208 such as depicted in FIG. 8. In some embodiments, each group member may be required to provide his or her own informed consent to joining the group. For instance, a group member might provide a signature, either physical or digital, signifying his consent to joining a group. A group member might also need to provide verification of his identity. Once again, a group member might use his signature, or some other biometric indicator. The group member might also present identification, such as a driver's license, credit card, birth certificate, etc. Another option would be for the group member to answer a question whose answer only the group member would know. Each group member might provide registration information about himself. Alternatively, one or more group members may provide information about other group members. In some embodiments, information about group members is already held in a casino server 102 database. The information may be on file from previous gambling sessions, for example. In some embodiments, group members are required to demonstrate they have a certain minimum amount of money with which to participate in the group. For example, if the playing group is to split winnings and losses amongst the members, then each member might be required to start with $100 with which to gamble. Group members may demonstrate possession of a certain amount of money by inserting the money into a gaming device 104, by changing the money for casino tokens at a casino desk, by providing the casino server 102 with means to access the members' checking accounts, and so on.

When registering for a group, group members may also provide personal information. When group members provide personal information, the information may be displayed to other group members to help them become acquainted with one another. Personal information may include occupations, hobbies, short autobiographies, etc. Personal information may also include pictures of the person, of the person's family, the person's home, and so on.

In some embodiments, once a first prospective group member has communicated to the casino server 102 his desire to form a group, the casino server 102 may ask others whether or not they would like to join. For example, Joe Smith informs the casino server 102 that he would like to form a playing group with his wife, Linda Smith. The casino server 102 then looks up Linda Smith in its user database 208 and finds the gaming device 104 on which she is currently playing (e.g. by reference to her player tracking card number). The casino server 102 then transmits a message to the gaming device 104, to be displayed to Linda Smith. The message asks her whether or not she wishes to form a playing group with her husband, Joe Smith. Linda may then indicate her willingness to join by, for example, touching an "agree" button on the touch screen of the gaming device 104. FIG. 4 shows an exemplary prompt asking a user whether or not she would like to join a group in which two group members compete against one another to see who wins more in payouts during a session.

There are a number of ways for the casino server 102 to prompt prospective group members to determine whether they wish to join a playing group. As described above, the casino server 102 may transmit a message via the casino's slot network to prospective members' gaming devices 104, 106, 108. A gaming device 104 that has received such a message 400 may then display it on the display screen 308 of the gaming device 104. Alternatively, the gaming device 104 may output an audio message to the user at the gaming device 104. The user may then respond by touching areas on the display screen 308, by keying in a response using a keypad or other buttons 312, or by voicing a response into a microphone of the gaming device 104. In some embodiments, the user remotely accesses a Web site of the casino server 102, e.g. via a user device such as a personal computer with a modem. In such embodiments, the casino server 102 may prompt the user by transmitting a message to the user over the current connection to the user's personal computer. For example, the casino server 102's Web site may include a chat feature, and the casino server 102 may prompt the user by sending the user a message over the chat line. The user may then respond by keying in a message and pressing the "enter" key to send it back to the casino server 102. In some embodiments, the casino server 102 may prompt the user via email. In some embodiments, the casino server 102 may prompt the user by calling the user's telephone or mobile phone. Those skilled in the art will recognize that there are many other means by which the casino server 102 may prompt the user, and there are many other means by which the user may respond.

In embodiments where the casino server 102 sends a prompt to a user asking whether the user would like to join a playing group, the prompt may contain several pieces of information. This information may include the names of the current group members; the names of users who will be asked to join the group; the objective of the group; how much money each group member will need to gamble as part of the group; how each group member's potential winnings and losses will be effected by joining the group; the time commitments necessary for joining the group; etc.

In some embodiments, one user asks another to join a group. For example, a first user begins by keying in the identifier of a second user. The identifier may include a name, player tracking card number, email address, screen handle, etc. The first user then keys in a message, such as, "Hi Sam, let's form that group we were talking about. Just tell the server you want to join group 359." The first user may then send the message to the second user via a network linking the two users' gaming devices 104, 106, 108, (112, 114), via the Internet, via the phone system, etc. The second user may then receive the message and view it on the display screen 308 of his gaming device 104, the monitor of his computer, the display screen of his personal digital assistant (PDA), etc. The second user might, for example, also hear the message in audio format.

Once a user has been prompted by the casino server 102, by a third-party, or by another user, the user may communicate to the casino server 102 his willingness to join the group. The user may, for example, navigate a series of screens on his gaming device 104 so as to call up a screen used for joining a group. The user may then fill in the identifier of the group he wishes to join, along with any required user information. In some embodiments, the prompt sent to the user contains a simple response mechanism, requiring the user only to touch the display screen, or to mouse-click over a certain area of the screen in order to join the group. Those skilled in the art will recognize that there are many other ways by which the user may indicate his willingness to join a group.

In some embodiments, a user is not prompted to join a group. Instead, he may be provided with access to a list of groups that are already in existence or in the process of formation. For example, the user may call up a screen on the casino server's Web site. The screen may list, for example, the "Riverside Group" as needing three more members, the "Springdale Baking Club" as full, the "Vegas Stompers" as open to an unlimited number of members, and the "Senior Citizens Group" as needing four more members, but only over the age of 65. The screen might list the current number of people in the group, and any general information about the group or its members.

Once a user has seen a listing of available groups, the user may choose to join one of the groups. The user might, for example, touch or click on the group name, input required user information, and then click a "join" button control. The existing group members may then have the opportunity to approve the new user. For example, each existing group member receives a message from the casino server 102 to the effect that a new user wishes to join the group. If the existing group members do not approve of the new user, as demonstrated through a vote or through some other signaling means, then the new group member may not be allowed to join.

In some embodiments users may receive periodic or real time updates as to what new groups are forming, what existing groups still need new members, and what groups are no longer open to new members.

In some embodiments, the casino server 102 itself may initiate the formation and registration of a group. The casino server 102 may initiate the formation of a group amongst users that it determines would be appropriate for a group. Group formation may be initiated among, for example, users who have arrived together at a casino; users who have elected to play at a designated "linked play" gaming devices; users who meet qualifying gaming criteria (i.e. the first five players to enter a bonus round on their gaming device); users who have eaten together; users who are rooming together; users who have consistently gambled in proximity to one another; users who's addresses indicate that they live near one another, or even in the same home or building; users who belong to the same family (e.g. as indicated by a common last name); and users who have previously belonged to the same group. In addition, the casino may initiate the formation of a group among people who, by all indications, probably do not know each other. However, there may be some commonality between the people, leading the casino server 102 to conclude that the people would be willing to form a group together. The people may, for example, have similar demographic characteristics, similar gambling or dining preferences, and so on.

In some embodiments, the casino server 102 may encourage the formation of groups so as dispose of excess inventories. For instance, a casino may project that ten hotel rooms will go unfilled for the night. Therefore, the casino may encourage the formation of a group that may win have hotel room stays as group prizes. Similarly, a casino may use extra show tickets, extra restaurant capacity, or excess goods from the casino's logo store as group prizes. The casino may also want more gaming devices 104, 106, 108 to be utilized during off hours, for example. By encouraging the formation of groups, a casino can ensure that each group member uses a gaming device 104 during the group's period of activity. Further, the casino may also encourage a group to play in one area of the casino that is less crowed so as to alleviate crowding in another area.

In some embodiments, the casino may encourage a particular person to enter into a playing group in order to increase the person's amount of play. For example, there may be a player that typically plays for only one hour per day at a particular casino. The casino might therefore want to encourage the player to join a group with a time commitment of two hours. As another example, there may be a player that typically plays slot machines costing only twenty-five cents per handle pull. The casino might encourage such a player to join a group that plays at dollar slot machines, so as to increase that player's gambling expenditures.

In some embodiments, an entry fee may be charged as part of the process of forming and registering a playing group. A playing group as a whole, or individual group members may be required to pay the casino server 102 for the privilege of playing as a group. For example, each group member might pay two tokens to join a group. The two-token entry fee may be seen as compensation for the casino server 102 for facilitating group play by tracking group results, maintaining lines of communication between group members, distributing winnings, etc. The casino server 102 may or may not then receive further compensation from the group or from group members. In some embodiments, additional compensation for the casino server 102 might include, for example, a percentage of a common pool put up by group members, a percentage of prizes won by group members due to the simultaneous attainment of particular outcomes, a percentage of a bet won from one group by another, and so on.

Other criteria that may be required to be met before a user is allowed to join a group may include a requirement that the user eat at the casino's restaurant, that the user have a room at the casino hotel, and/or that the user have spent a certain amount of money at the casino's store. In some embodiments, a user may be required to attain a particular symbol or outcome in order to gain admittance to a group. In some embodiments, a user's winnings from one gambling session may serve as an entry fee into a group. Group members may in some embodiments only be admitted by paying the entry fee from gambling winnings. In some embodiments, a user may be required to use comp points to gain entry into a group.

In some embodiments, there may be no entry fee or the casino may even pay people to join groups. A casino might be motivated to pay people to join groups because group members may engage in a significant amount of gambling activity. For instance, if a group session is to last for two hours, a casino might expect to earn $60 from the gambling activities of each group member, and might therefore be willing to pay a person $20 to join the group.

Once a group has formed, the casino server 102 may create an entry for the group in a group database 210 such as that depicted in FIG. 9. As discussed above, a group database 210 may identify the members of a group, any common characteristics of the group members, and the sessions in which the group has participated.

2. Establishing a Group Objective and a Group Format

In Step S2, the casino server 102, casino, and/or group establishes the group objective and group format for the group. The objective of a group may include the prizes the group plays for and the criteria necessary to win prizes. The group format may describe the guidelines the group members are required to follow and the structure of the group. The group format may also include ways in which prizes will be distributed among group members, the times during which group play may occur, the amount group members may be required to gamble, and soon.

It is important to note that participation in some embodiments of group play may not necessarily drastically alter a group member's gaming experience. For example, a group might have the objective of achieving $200 in net winnings among the group members over the course of an hour. If the group achieves the $200 mark, then each group member receives a free night's stay at the casino's hotel. During the hour-long group session, although each group member's winnings are counted towards the group's goal, each individual group member may still pay wagers out of his own funds, and may still keep any winnings for himself. Therefore, in this example embodiment, group play has served as an overlay to the typical gaming experience, not a complete alteration.

In some embodiments, the objective and format of a group may be chosen by the casino server 102 and/or by the group members themselves. For example, each member of the group may vote on a group leader. The group leader may then communicate to the casino server 102 his desired objective for the group. (Presumably, the group leader's views represent those of the other group members as well, since they elected him.) The group leader may navigate a set of screens or menus on a Web site of the casino server 102. The group leader may, for example, select group format and objective options such as: an amount of betting group members are required to make, the types of games group members are required to play, the times during which group members are required to gamble, the results the group members are required to achieve in order to win prizes (e.g. net winnings of $100, 3 "cherry-cherry-cherry" outcomes within 2 minutes, etc.), the group prizes, other incentives to be provided to group members (e.g. T-shirts, hats, free breakfast, etc.), whether group members are to compete amongst themselves, against the casino, or against another group, the amount of money each group member is required to put into a separate pool to be allotted as prizes, and the proportion in which prizes will be allocated to a first, second, third, etc. winner in a competition among group members.

There are many other objective and format items that might be chosen. Of course, any of these could be chosen by individual group members as well as by a group leader. The choice most popular among the group members could then be put into practice by the casino server 102. Thus, if most group members wanted the group's session to be from 4:00 pm to 5:00 pm, then the casino server 102 would communicate to the group members that the session is, in fact, to be from 4:00 pm to 5:00 pm. Alternatively, users may choose different aspects of a group format they desire, and then they may be placed by the casino server 102 into different groups accordingly. The group leader or group members may choose the format and objectives using, for example, personal computer terminals connected to the casino server's Web site via the Internet, using gaming devices 104, 106, 108, (112, 114), using phones, using email, or using any other mode of communication.

Once a casino server 102 has received information about a group's format and a group's objective, the casino server 102 may store such information in a group session database 212 such as depicted in FIG. 10. Note that in the particular example group session database 212 of FIG. 10, a different format and a different objective is assigned to each group session, even if two sessions are for the same group. This allows a group to have a different format and a different objective from session to session.

(a) Combinations of Outcomes

In some embodiments, playing group members may win prizes based on the combination of gambling outcomes obtained by individual group members. For example, if at least two group members achieve a straight flush on their respective gaming devices within a set time period, then the two group members or the group as a whole may receive an especially large prize. In another example embodiment, if all five members of a group achieve seven cherries between them on a single designated handle pull, then the group as a whole wins $200.

In some embodiments, individual group members' outcomes may be combined togeather in an attempt to win larger prizes in many different ways. For example, outcomes may be combined by adding two or more group members' net or gross winnings for a given time period and then comparing the sum to a threshold. The group members may receive a prize if the sum exceeds the threshold. Net or gross winnings may not only be added, but instead combined using any number of other functions. For example, group members' winnings may be averaged or multiplied. The standard deviation of group members' winnings may be determined. Any other function of group members' net or gross winnings may be calculated. In addition, the criteria for winning a prize may be something other than a comparison with a threshold. For example, the sum of group members' gross winnings may be required to be an even multiple of 100 tokens for the group to get a 50-token bonus.

Other potential methods of combining outcomes according to the present invention include group objectives that require two or more group members have simultaneous or proximate winning outcomes, require a defined number of outcomes to be accumulated within a defined time period by the group; require two or more group members have simultaneous or proximate losing outcomes, require two or more group members have simultaneous or proximate identical outcomes (regardless of whether the outcomes are winning outcomes), require two or more group members have simultaneous or proximate outcomes that pay the same amount, require two or more group members each have predetermined length streaks of winning (or losing) outcomes, require two or more group members have streaks of winning (or losing) outcomes that combine to a certain predetermined length, and/or require two or more group members have streaks during which each group member made a synchronized handle pull with the other group members, and for each set of synchronous pulls, at least one of the group members achieved a winning (or losing) outcome.

In the above examples, the terms "simultaneous" and "proximate" may refer to a number of specific events that lead up to the generation of a final outcome. These events may include, for example, the initiation of a handle pull, the determination of an outcome, the display of an outcome, the resolution of an outcome, the initiation of a player decision, and/or the completion of a player decision. The initiation of a handle pull, for example, includes a user pulling the handle of a slot machine or pressing a "spin" button.

The determination of an outcome includes, for example, the processor of the gaming device 104 executing a program that generates one or more random numbers. The random numbers are then matched to a corresponding outcome using a table of outcomes stored in memory. The outcome may be a primary outcome or any secondary outcome. For instance, in one variant of video poker, the primary outcome is the first five cards dealt to a player. A secondary outcome includes a player's hand after his discards are replaced with new cards. In slot machine embodiments, a primary outcome may be an entry into a bonus round, and a secondary outcome may be the resolution of the bonus round, where the player finds out the amount of his prize and receives the prize.

The display of an outcome includes, for example, the reels of a slot machine stopping with the determined outcome displayed along the pay line. Once again, the outcome may be a primary outcome or any secondary outcome. The resolution of an outcome may occur, for example, when the gaming device 104 pays the player based on the outcome by, for example, dropping coins into the player's tray, or adding credits to the player's credit meter. Resolution may also occur when a gaming device 104 indicates readiness for a new wager. For instance, buttons for designating wager amounts light up when the gaming device 104 is ready for a new handle pull. The initiation of a player decision includes, for example, the player choosing his first discard in a game of video poker. The completion of a player decision includes, for instance, the player having chosen all his discards in video poker and hitting the "deal" button.

As the following example illustrates, it may be important for a casino to be careful in choosing what events to reference when awarding prizes based on the simultaneous occurrence of outcomes. Suppose that the casino offers to award a $1000 prize to a two-person group of video poker players if both players obtain a straight-flush and both resolve the outcome within two seconds of one another. Suppose further that once one player obtains four cards to a straight-flush, he simply waits before choosing his discard. He continues waiting until the other group member achieves a straight-flush. Only then does he quickly choose his discard and have his outcome resolved. Using this procedure, the group can obtain straight-flushes simultaneously much more frequently than may be intended by the casino. To prevent one group member from waiting for another, in some embodiments, the casino might specify that for two outcomes to count as occurring simultaneously, the handle pulls are required to have been initiated simultaneously.

The ability to award prizes based on the occurrence of combinations of outcomes on multiple gaming devices overcomes a significant disadvantage of many individual gaming devices. On many gaming devices, even the highest paying outcome may have a 1 to 10,000 or 1 in 100,000 chance of occurring. This prevents the gaming device, in the former case, from paying more than 10,000 tokens for the highest payout, and prevents the gaming device 104 from paying more than 100,000 tokens in the latter case (assuming a one-token wager). This is because, if a one-token wager can win more than 10,000 tokens for an outcome that has a 1 to 10,000 chance of occurring, then the expected payout for the one-token wager is more than one token. Thus, the gaming device 104 would be unprofitable for the casino.

The combination of outcomes from multiple gaming devices overcomes the problem of outcomes occurring too frequently to offer a high corresponding payout. A casino could, for example, offer a one million-token payout to a group of four people if all obtained the outcome of "orange-orange-orange" on the same spin. Even though the outcome of "orange-orange-orange" may be fairly common on an individual gaming device, say 1 in 100, the chances of four gaming devices each obtaining "orange-orange-orange" on the same spin would be minute. In this case the chances would be 1 in 1004, or 1 in 100 million. Therefore, the casino could safely offer a chance at the one million token prize to the group.

A potentially confusing situation may arise when two or more group members play at gaming devices of different varieties. For example, one gaming device 104 may use fruit symbols and another may use symbols with an ancient Egyptian theme (e.g. mummies, pyramids, gold, etc.). Or one gaming device 104 is a reel slot machine and another is a video poker machine. When two or more group members utilize dissimilar gaming devices, in some embodiments the casino server 102 may explicitly describe what outcome at a first gaming device, and what outcome at a second gaming can be obtained in combination so as to win a prize for the group. For instance, a group may receive a $1000 bonus prize when a first group member achieves an outcome of "bell-bell-bell" at a reel slot machine and a second group member achieves an outcome of four-of-a-kind at a video poker within one minute of the first group member's outcome. Therefore, when a group or when group members register with the casino server, the casino server 102 may display to the group members a table indicating the combinations of outcomes that might be achieved in order to win group prizes. An example of such a display is depicted in the table 600 of FIG. 6. In FIG. 6, the first and third columns 602, 606 show outcomes that win prizes for the group or certain group members if the outcomes are attained in temporal proximity to one another. The fifth column 610 shows the prize won when the outcomes are obtained in temporal proximity. The second and fourth columns 604, 608 show the payouts for the outcomes when they occur alone.

Another embodiment that allows two group members to play at gaming devices of different varieties and still combine outcomes, specifies outcomes in terms of their respective payouts. For example, two group members may be required to simultaneously obtain outcomes with payouts of $50 or more in order for the group to win a large prize. In such an embodiment it does not matter at what specific games the outcomes were obtained. If outcomes are specified in terms of dollars, or in terms of tokens, a wager size may also be specified. For example, two group members, making wagers of $1 or less, may be required to simultaneously obtain outcomes with payouts of $50 or greater in order for the group to win a large prize. If a wager size were not specified, a group member might make a wager of $25, in which case it might be fairly easy to hit a payout over $50. Alternatively, an outcome may be specified in terms of the ratio of the payout to the wager. For example, an outcome may be specified as "50:1". In such an embodiment, a wager size need not be specified.

Some prizes that one or more members of a linked play group may win include cash, credits, gambling tokens, free or discounted rooms, free or discounted show tickets, free or discounted meals, free or discounted merchandise from a casino's shops or affiliated merchants, increased odds of winning particular outcomes, extra winning outcomes, free spins, extra pay lines, increased credit lines, priority on the use of particular gaming devices, priority on getting tables at casino restaurants, priority on getting tickets to shows, priority on sitting down at table games, a donation to charity on behalf of the group, and/or recognition. A group member may be recognized by having his name and/or image displayed to other group members as the winner of a competition. The winner may also be announced to people outside of the group, such as to other casino patrons. Note that the above prizes may be awarded as a prize for any type of linked play, not just combinations of outcomes type embodiments.

When a playing group, or playing group members have the opportunity to win prizes based on a combination of individuals' outcomes, there may be a risk that the casino will have to pay out a larger amount of money than would be indicated by individual gaming devices' hold percentages. For example, suppose each member of a five-person playing group gambles at an identical slot machine with a 5% hold percentage. With a 5% hold percentage, each gaming device 104 pays an average of 0.95 tokens in payouts for every token wagered. If the playing group now has the opportunity to win a 300-token bonus prize when any two group members receive the outcomes of "cherry-cherry-cherry" within the same second, then the effective hold percentage of the group of five gaming devices may go down. The effective hold percentage may be reduced to, for example, 1%, or even to a negative percentage.

To offset the reduction in gaming devices' effective hold percentages resulting from payouts awarded for combinations of outcomes, the payouts for individual outcomes may be reduced. For example, suppose that the typical payout for a "cherry-cherry-cherry" outcome is 20 tokens. If an additional prize of 300 tokens is awarded to a five-person playing group when any two gaming devices hit "cherry-cherry-cherry" within one second of each other, then the payout for "cherry-cherry-cherry" occurring on a single gaming device 104 may be reduced from 20 tokens to 10 tokens. In this way, a group member may not profit as much as he would have playing as an individual when his own gaming device 104 hits a winning outcome. However, in a linked play system, when a second group member hits a winning outcome at the same time as a first group member, then the first group member profits by a lot more than he would have playing as an individual.

In some embodiments, the effective decrease in hold percentages due to the payment of prizes based on combinations of outcomes may be nearly or exactly offset by the decrease in payouts for outcomes achieved individually. In the above example, the awarding of a 300 token payout to a group of five members when two or more group members achieve "cherry-cherry-cherry" may decrease the effective hold percentage of the gaming device 104 by 4%. However, the halving of the payout for "cherry-cherry-cherry" from 20 tokens to 10 tokens may increase the effective hold percentage of the gaming device 104 by 4%. Thus the effects of group play and the reduction in payouts for individual outcomes cancel each other, and the effective hold percentage of the gaming device 104 remains the same.

The following example illustrates how a decrease in a gaming device's effective hold percentage due to the awarding of bonus prizes may be offset. Suppose Tim and Robert form a two-person group. The format of the group allows them to make 100 spins each, with a wager of 1 token per spin, on a 3-reel fruit slot machine. In this example, the slot machine has the following payout structure, (taken from "Winning At Slot Machines," by Jim Regan (Pub. Lyle Stuart, 1985; ISBN: 0806509732), which is incorporated herein by reference):

| | Outcome | | | | | | | | | | | | | | | | | |
|---|---|---|---|---|---|---|---|---|---|---|---|---|---|---|---|---|---|---|
| | 0 | 2 | 2 | 5 | 5 | 5 | 20 | 10 | 10 | 20* | 14 | 14 | 20 | 18 | 18 | 20 | 50 | 100 |
| Hits | 8570 | 680 | 680 | 200 | 200 | 68 | 20 | 42 | 6 | 42 | 20 | 5 | 50 | 4 | 20 | 20 | 20 | 1 |

In the above table, "Outcome" represents the number of tokens paid, and "Hits" represents the number of times the corresponding outcome would be expected to occur in 10,648 spins, or a complete cycle of the slot machine. The probability of each outcome occurring on a single spin can be found by dividing the "Hits" entry by 10,648. For example, the probability of the outcome that pays 100 tokens appearing on a single spin is $$1/10,648 \approx 9.39*10^{-5}$$

Now, if Tim inserts a single token into the slot machine, his expected winning are given by:

$$EV = 0*8570/10,648+2*680/10,648+2*680/10,648+5*200/10,648+\ldots+100*1/10,648 \approx 0.945$$

Therefore, for every token Tim inserts, he can expect to receive 0.945 tokens back, making for a hold percentage of:

$$1-0.945 \approx 0.055, \text{ or } 5.5\%$$

Continuing with the example, in the group formed by Tim and Robert, Tim's spins are numbered from 1 to 100, and so are Robert's. Suppose that if Tim and Robert both achieve the outcome of "orange-orange-orange" on like numbered spins, then each will receive a bonus payout 10,000 tokens. For example, if Tim and Robert each get "orange-orange-orange" on spin number 27, then both receive 10,000 bonus tokens in addition to the payout received for "orange-orange-orange". The "*" in the table above represents the outcome "orange-orange-orange". As can be seen, the probability of "orange-orange-orange" occurring on any single spin is given by $$42/10,648 \approx 0.00394, \text{ or } 0.394\%$$

To find the effective hold percentage of Tim's machine with the bonus payout structure in place, the probability of Tim and Robert achieving "orange-orange-orange" on the same spin is determined. Since the outcomes of the spins are independent, the probability is just the product of the probabilities of achieving "orange-orange-orange" on a single spin:

$$(42/10,648)*(42/10,648) \approx 1.56*10^{-5}, \text{ or } 0.00156\%$$

Therefore, on every spin, Tim wins 10,000 tokens with probability $1.56*10^{-5}$, for an additional expected payout of $$10,000*1.56*10^{-5} \approx 0.156 \text{ tokens}$$

The total expected payout of Tim's machine becomes $$0.945+0.156 \approx 1.10 \text{ tokens}$$

for every token inserted. The hold percentage has become $$1-1.10 \approx -10\%$$

This is not good for the casino, since it now expects to pay out more than it takes in, resulting in a loss for the casino. There are several possible remedies.

One remedy for the negative effective hold percentage of Tim and Robert's slot machines is to charge Tim and Robert an entry fee. Since each will make 100 spins, and the casino can expect to lose 10 tokens per player per spin, the casino can justify charging an entry fee of, say, 0.15 tokens per spin, or $15 per player for the entire session. When the entry fee is factored in, the hold percentage for the machine becomes $$1-1.10+0.15 \approx 5\%$$

which is more satisfactory for the casino.

Another remedy for the negative hold percentage is to reduce some of the existing payouts. For example, the existing expected payout for each player derived from the "orange-orange-orange" outcome (not including the bonus payout) is given by the probability of achieving "orange-orange-orange" times the payout for "orange-orange-orange", or $$42/10,648*20 \approx 0.0789 \text{ tokens}$$

This payout for an occurrence of "orange-orange-orange" on only one of the two machines during a single spin can be eliminated entirely, making the hold percentage of each slot machine:

$$1-(1.10-0.0789) \approx -2.17\%$$

This hold percentage is still unsatisfactory to the casino, as it is still expects to lose more than 2% of all tokens taken in. So the casino can make further adjustments to the payout table. For instance, in the above table, the outcome in the third column from the left represents "cherry-any-any". The payout for "cherry-any-any" is 2 and the probability of the outcome occurring is 680/10,648. If the payout for "cherry-any-any" is reduced to 1, then the expected payout for the player on each spin is reduced by an additional $$680/10,648*1 \approx 0.0639 \text{ tokens}$$

The effective hold percentage for each slot machine now becomes:

$$1-(1.10-0.0789-0.0639) \approx 0.042, \text{ or } 4.2\%$$

This may be acceptable to the casino. The new pay structure of the slot machines of Tim and Robert now looks like:

| | Outcome | | | | | | | | | | | | | | | | | |
|---|---|---|---|---|---|---|---|---|---|---|---|---|---|---|---|---|---|---|
| | 0 | 1 | 2 | 5 | 5 | 5 | 20 | 10 | 10 | 0* | 14 | 14 | 20 | 18 | 18 | 20 | 50 | 100 |
| Hits | 8570 | 680 | 680 | 200 | 200 | 68 | 20 | 42 | 6 | 42 | 20 | 5 | 50 | 4 | 20 | 20 | 20 | 1 |

Although one payout has been reduced, and another eliminated, the bonus payout for the simultaneous occurrence of "orange-orange-orange" has given Tim and Rob a higher expected payout on every spin, and the possibility of achieving a payout 100 times larger than anything that was originally possible.

(b) Prizes Dependent on the Amount of Group Play

In some embodiments, rather than winning a fixed prize, a group, or group members, may receive a prize that is related to the amount of group play. Measures of the amount of group play may include: an amount of time group members have spent gaming, an amount of money (or tokens, or credits) group members have wagered (i.e. coin-in), an amount of money group members have lost, an amount of money group members have won, a number of handle pulls group members have made All measures may refer to a group total, to a group average, or to some other statistic. For example, the amount of time group members have spent gaming may refer to the total amount of time all group members have spent gaming, the average amount of time gaming per group member, the amount of time gambled by the group member who gambled the least, and so on.

In an exemplary embodiment, a casino may contribute to a pool of prize money that is to be awarded to a group if the group meets a certain criterion, such as achieving net winnings of $200. The amount of money the casino contributes may depend on the amount of play by the group. In particular, the amount the casino contributes to the pool may increase in proportion to the amount of play of the group.

(c) Sharing Winnings and Losses

In some embodiments, playing groups are large enough so that winnings and losses are likely to be evenly distributed among the group members. Such a group may provide several benefits to its members. Group members have lower risks of large losses, since a session of bad gambling outcomes may be offset by a session of good outcomes obtained by other group members. Furthermore, at the end of a playing session, group members will be in similar moods, each having experienced the same financial results. In such embodiments, each person may put in a fixed amount of money, say $100, to a common pool. A playing group member may place money into the common pool by, for example, inserting money into a gaming device 104 and indicating via the touch screen 308 that the money is to be placed into the group's common pool. The casino server 102 may then track the size of the common pool. Each handle pull by any of the group members may be charged to the common pool. So if a handle pull costs $1, then each time a group member makes a handle pull, $1 is deducted from the common pool. However, the amount of any winnings by a group member may be added to the common pool. At the end of a gambling session, the pool is divided evenly among the group members. For example, the casino server 102 divides the size of the common pool by the number of group members, and instructs the gaming device 104 of each group member to pay the group member the resultant amount.

In some embodiments, all playing group members do not contribute the same amount to the common pool. In these embodiments, winnings and losses may be divided among group members in proportion to the amount contributed by each group member. For example, suppose Joe, Sam, Linda, and Susan have contributed $100, $200, $300, and $400, respectively, to a common pool. Thus, the common pool initially contains $1000. Then, at the end of the gambling session, the pool contains only half as much: $500. In such embodiments, each group member would receive half of his initial contribution. Therefore, Joe, Sam, Linda, and Susan would receive $50, $100, $150, and $200, respectively. Had the pool contained $2000 at the end of the gambling session, then Joe, Sam, Linda, and Susan would have received $200, $400, $600, and $800, respectively.

In embodiments with a common pool, all group members need not make all of their contributions prior to the start of a gambling session. Rather, each new wager a group member makes may buy the group member a "share" of the common pool. Any winnings from the wager then go into the common pool, to be divided among all group members in proportion to each member's share in the common pool. Shares of the common pool may be allocated based on the relative size of the common pool and a group member's wager at the time the wager is made. Suppose, for example, that an existing common pool includes 999 tokens and a new group member makes his first wager of 1 token to buy a share of the common pool. The group member then receives a share of the common pool equal to his wager divided by the total size of his wager and the common pool, or $$1/(1+999)=1/1000$$

If the group member then generates a payout of 1001 tokens, the winnings go into the common pool, and the size of the pool is then increased to $$1001+999=2000 \text{ tokens}$$

The group member may then cash out his 1/1000 share of the common pool to receive:

$$1/1000*2000 \text{ tokens}=2 \text{ tokens}$$

A group member may not always maintain a fixed share of the pool. Rather, the group member's share may become diluted when other group members buy into the pool. For example, suppose a first group member owns a 1/1000 share of a pool of 2000 tokens. The first group member does not cash out his share, but also does not continue wagering. Then, a second group member begins wagering to buy shares in the common pool. The second group member makes a wager of 2 tokens to buy a share of the common pool equal to $$2/(2000+2)=1/1001$$

Suppose the wager does not win, so the size of the pool remains at 2000 tokens. The first group member's share of the common pool has been diluted by the second group member, by a factor of one minus the second group member's new share of the common pool. Thus, the first group member has been diluted by a factor of $$1-1/1001=1000/1001$$

Therefore, the first group member's share of the common pool is now his original share multiplied by the dilution factor, or $$1/1000\times1000/1001=1/1001$$

So when the second group member bought a share of the common pool, the first group member's share went from 1/1000 of the common pool, to 1/1001 of the common pool. However, the reduction in the first group member's share was partially offset by the fact that winnings from the second group member's wager might have gone into the common pool, increasing the value of the first group member's share.

In some embodiments, group members do not split winnings and losses based on monetary contributions alone, but also based on group members' performances during a linked gaming session. For instance, Abby and Bill each contribute $100 to a group pool. For the next hour, all of Abby and Bill's wagers come from the pool, and all of their winnings go into the pool. After one hour, Abby and Bill divide up the pool. However, they may not necessarily divide the pool evenly. In some embodiments, Abby might receive a larger percentage of the pool if her play was better than Bill's. If, for example, Abby and Bill had been playing video poker and Abby's decisions were consistently better than Bill's in the sense that her decisions yielded the highest expected value on a subsequent random event, whereas Bill's decisions did not always lead to the highest possible expected value, Abby might receive a larger percentage of the pool even though she may have been unlucky and ended up actually winning less than Bill.

Group members might split winnings in part based on the amounts won by each individual. If, for example, Abby's net win is $20, and Bill's net win is −$20, then, at the end of the hour, Abby's total contribution to the pool has been her initial contribution plus her net winnings, or $120, and Bill's total contribution has been $80. Abby has then contributed $120/($120+$80)=60% of the pool and Bill has contributed 40%. The pool might therefore be divided with 60% going to Abby and 40% to Bill. Alternatively, in some embodiments, Abby and Bill's winnings might be made more comparable by subtracting a fixed percentage from the leading contributor, and adding the fixed percentage to the lagging contributor. Thus, in a embodiment using 5% as the fixed percentage, Abby might only receive 60%−5%=55% of the winnings, and Bill might receive 40%+5%=45% of the winnings. Pool allocations may also be made based on relative gross winnings, on the relative total amounts wagered, on the relative number of outcomes exceeding, for example, 100 achieved, and so on, including any combination of the aforementioned. The division of any prizes won either from the casino or from another group may also be likewise divided amongst group members based on quality of group members' decisions, net winnings, etc.

(d) Group Members Compete

In some embodiments, all members of a group may compete against one another. The group members might compete in order to achieve one or more of the following winning criteria: the highest net or gross winnings, the most winning outcomes, the most winning outcomes above a certain level, the most outcomes with payouts above a certain level, the longest duration of play without losing more than a certain amount of money, the longest duration of play without winning, the longest duration of play without running out of money, the most of a particular symbol collected, the most gaming devices played, the largest payout, the largest number of visits to one or more casinos, the most money spent at the casino, be it on gambling, shopping, meals, entertainment, the most number of gaming decisions that provide optimal expected value strategy, and/or the most wins over the other group members on individual pulls. For example, a group member wins a pull when he obtains a higher payout on that pull than do all other group members. This might require each group member to perform synchronized handle pulls, or each group members' pulls to be numbered.

The winning group member might receive a prize in the form of cash, tokens, show tickets, meal tickets, rooms, or merchandise from the casino. In particular, show tickets, meal tickets, rooms, or merchandise, may be in excess, and the casino may award group prizes as a convenient means of utilizing the show tickets, rooms, etc.

When group members compete with one another, in some embodiments, each group member might contribute to a prize pool. For example, each group member might contribute $20 and the winning group member receives the prize pool. In some cases, the prize pool may be divided between two or more group members. For example, in a competition, the first place group member may receive 60% of the prize pool, the second place group member may receive 30% of the prize pool, and the third place group member may receive 10%.

The casino server 102 may facilitate the competition between group members by receiving group members' registration information, by keeping track of the group members' results, by comparing the group members' results, and by determining a winner. The casino server 102 also facilitates competition between group members by receiving each group member's contribution to the prize pool. The casino server 102 may receive the contributions via gaming devices 104, 106, 108, (112, 114). The casino server 102 may then make note of each group member's contribution to the prize pool. Finally, at the conclusion of the competition, the casino server 102 may instruct the gaming device 104 of the winner to pay the winner his amount due from the prize pool. The casino may keep a percentage of the prize pool for itself as payment for facilitating the competition.

(e) Groups Compete with Other Groups

In some embodiments, one group may compete against one or more other groups. The casino may sponsor a prize to be given the group that wins the competition. For example, each member of the winning group may receive a free meal at the casino's restaurant. Alternatively, each group may contribute money or other prizes to a common prize pool. At the end of competition, the winning group or groups may then collect the prize pool. Once again, in some embodiments, the casino may keep a portion of the prize pool as a service fee.

One group may seek competition against another group with certain characteristics. For instance, if a first group is a husband and wife team, then the group may seek competition against another husband and wife team. A group of bowling buddies may seek competition against another group of bowlers. In general, a group or a representative of a group may communicate to the casino server 102 any conceivable characteristics desired in a competing group. The casino server 102 may then consult a group database 210 to find a potential competitor group with all or some of the desired characteristics. The casino server 102 may then attempt to find a time and group competition format that is agreeable to both groups. If both groups agree to the competition, then the competition may take place. Of course, in some embodiments, more than two groups may compete with one another.

(f) Asynchronous Play

In some embodiments, group members, whether they team up against the casino or another group, or whether they compete against one another, need not play at the same times. For example, suppose Jack and Henry form a group in which both will win a substantial prize if they each achieve four-of-a-kind in video poker within three spins of one another. However, Jack plays from 10:00 am to 10:30 am, and Henry plays from 3:30 pm to 4:00 pm. So that it makes sense to talk about being "within three spins of one another," each spin made by Jack and Henry is numbered. Jack's first spin is numbered "1", his second spin is numbered "2", and so on. Similarly, Henry's first spin is numbered "1", his second spin is numbered "2", and so on. In some embodiments, for two outcomes to be considered to occur within three spins of one another, the absolute value of the difference between the two spin numbers may be required to be three or less. Thus, if Jack achieves four-of-a-kind on his $10^{th}$ spin, and Henry achieves four-of-a-kind on his $12^{th}$ spin, then the absolute value of the difference between the spin numbers is given by:

$$|10-12|=2$$

Therefore, since the absolute value of the difference between the spin numbers is less than three, Jack and Henry qualify for the substantial prize.

In some embodiments, asynchronous competition may create excitement among group members when a first group member achieves a key outcome and then may be required to wait for a second group member to play and to possibly achieve a matching key outcome. In the previous example, once Jack had achieved the four-of-a-kind on his $10^{th}$ spin, Jack would have to wait several hours to see whether Henry would achieve a four-of-a-kind within three spins of Jack. The wait would build excitement for both Jack and Henry.

In general, group play may occur over any single or multiple time intervals. Group play might last for a few minutes, an hour, a day, a week, a month, a year, or longer. Group play may be continuous, or it could occur during multiple separate time intervals, such as every Sunday between 6:00 and 7:00 pm.

In some embodiments, two competing group members may choose a subset of their attained outcomes to use in the competition against the other. For example, both group members play the slots for an hour, from 10:00 am to 11:00 am. The winner of the competition is the group member who had the highest net winnings for any ten-minute period during the hour played. The first group member might have sustained an $80 net loss for the hour, but may have won $30 over the period of 10:27 to 10:37. Meanwhile, the second group member may have won $20 over the course of the hour, but may have a peak 10-minute performance of only $25, from 10:42 to 10:52. Thus, the first group member would win the competition in such an embodiment.

Many other subsets of a gambling session may be used for a competition. For instance a group member's best 50 consecutive pulls, a group member's best 10 pulls (not necessarily consecutive), a group member's worst 50 consecutive pulls, and a group member's longest string of plays at a video poker machine in which every hand contained a heart; are all examples of subsets of gambling sessions that might be used for a competition. In some embodiments, a user may be required to choose between keeping the winnings from a set of handle pulls, or entering the set of handle pulls into a competition, in which case he would not keep the winnings, but would have the chance to win a potentially large prize. For example, Sam plays video blackjack for 20 minutes and amasses 70 extra credits from his 20 minutes of play. Sam may choose to take the credits, or to forego the credits and use his 20 minutes of play as an entry into a competition for 1000 credits. The winner of the 1000 credits would be the person who has won the most credits during the 20 minutes of play, but has chosen to forego the credits and enter into the competition.

(g) Dependent Outcomes

Typically, two people at separate gaming devices generate outcomes that are statistically independent of one another. However, when two or more people join a group, their outcomes need no longer be independent. For example, if two video poker players join a group, when each makes a handle pull at the same time, both group members may be dealt cards from the same electronic deck. Thus, if the electronic deck is a standard 52-card deck, then both group members cannot have the same cards in their respective hands. In such embodiments, both group members may gain a strategic advantage by looking at the other's hand. Knowing that that a first group member has a desired card, a second group member would no longer try to draw for that same card. This also makes it harder for two players to get a heart flush simultaneously.

In reel-slot machine embodiments, two group members may play the same virtual set of reels. However, the two group members may utilize different pay lines. Therefore, if "bell" and "lemon" are adjacent symbols on the first reel, "cherry" and "blank" are adjacent symbols on the second reel, and "orange" and "plum" are adjacent symbols on the third reel; then the first group member may attain the outcome of "bell-cherry-orange" while the second group member attains the outcome of "lemon-blank-plum".

In video roulette embodiments, each group member may wager on outcomes to be generated by the same virtual roulette wheel.

There are many other embodiments in which the outcomes of group members at gaming devices could be dependent on one another. In perhaps the simplest embodiment, two or more group members may wager on the exact same event and the outcome may be displayed simultaneously on each of the group members' gaming devices. For instance, two group members make a wager at their respective gaming devices, the same set of virtual reels is then used to generate an outcome, the (same) outcome is displayed on both gaming devices, and both group members are paid according to the single outcome.

When two or more group members generate dependent outcomes, the casino server 102 may generate both the outcomes, communicate the outcomes to the group members' gaming devices 104, 106, 108, and have the gaming devices 104, 106, 108 display the outcomes. Alternatively, one of the gaming devices 104 might generate the outcomes and transmit each outcome to the gaming device 106 operated by the other group member.

(h) Multi-player Progressives

In some embodiments, a portion of each group member's wager may go into a pool of money held by the casino. When one of the group members obtains a predetermined outcome, the group member may win all or a portion of the pool. Upon the formation of the group, each group member might contribute a certain amount of money to the pool so that the pool does not start out at zero. Group members may also contribute money to start the pool after the pool has been won. In some embodiments, the group member who won the previous pool may contribute a portion of his winnings to the next pool.

(i) Non-outcome Based Competition

Competition need not only be based on the results of handle pulls. In some embodiments, competition is based on group members' answers to trivia questions. Throughout the course of a competition, the casino server 102 may transmit trivia questions to the gaming devices 104, 106, 108, (112, 114) of group members. A gaming device 104 may then display a trivia question on its display screen 308. The trivia question may include four possible answers. A group member at the gaming device 104 may answer the question by, for example, touching one of the possible answers on the display screen 308. The gaming device 104 may then transmit the group member's answer back to the casino server 102. At the end of a competition, the casino server 102 may tally the correct and incorrect answers submitted by group members, or by entire groups, as appropriate. For example, if competition is between group members, then the casino server 102 may tally the number of correct answers for each group member. The group member with the most correct answers may then win. For competitions pitting a group against the casino, the casino server 102 may tally the total number of correct answers submitted by all group members, compare the tally to a threshold, and thereby determine whether or not the group has won.

So as to encourage gambling even during competitions that are not based on outcomes, the casino server 102 may require a certain rate of handle pulls during competitions. If a user does not meet the required minimum rate of play, then, for example, some of the user's answers may not count.

Aside from trivia games, a number of other supplementary games may serve as a basis for competition. For example, as group members play five-reel slot machines, they may also be involved in a Bridge game. Group members might also play Scrabble™, Mah Jongg, Chess, Hearts, etc.

(j) Group Events

The casino server 102 may seek to improve a group's gaming experience by facilitating various group events. Group events may include group meals, group outings (e.g. to golf courses, movies, shows, aquariums, etc.), group pep rallies, group award ceremonies, and so on. Group events may be paid for by the casino, by group members, or partly by each. At group events, group members may receive merchandise relating to the group. For example, group members may receive scrapbooks with pictures of group members and representations of group member outcomes from throughout the group session. Group members may also receive cash or merchandise prizes, certificates, trophies, and verbal recognition. By holding group events, a casino may facilitate camaraderie and enjoyment among the group members. In addition, the casino may encourage group members to remain at a casino longer so as to attend a group event. For example, suppose a group competes against the casino from 4:00 pm to 5:00 pm and wins a prize of $1000. The casino may hold an awards ceremony for the group at 7:00 pm, during which the group is to pick up the prize and some trophies. The group is thereby encouraged to remain at the casino until at least 7:00 pm. Therefore, the group members may spend an additional two hours gambling between 5:00 pm and 7:00 pm, creating potential profits for the casino.

Group events are also an opportunity for people from the same group to meet if they have never met before, or if they do not see each other often. For example, a mother and adult daughter may form a group and compete with other group members via the Internet. If the mother and daughter play consistently, then the casino server 102 might provide the mother and daughter with free plane tickets to Las Vegas, and free accommodations on an annual basis. Then, the mother and daughter would have a chance to see each other, and to gamble together in Las Vegas.

In addition to group members coming together during group events, people from separate groups may also meet at casino sponsored events. Perhaps the groups have competed against one another, or have competed together against the casino.

3. Initiating the Linked Play According to the Group Format

In Step S3, group play may begin at a designated time once the casino server 102 has received all members' registration information. The designated time may be chosen by the casino server 102 or by group members at the time of registration. In some cases, group play may begin almost immediately after every group member agrees to begin. Some groups may be dynamic and allow for new members even after group play has started. In this case, play may begin once a certain minimum number of group members have registered.

Beginning a group session does not mean that every current group member is required to begin gambling or otherwise working towards group goals. Individual group members may gamble according to their own timetables, so long as their gambling falls within the time of the group session.

As the linked play session proceeds, each group member's gaming device 104 may transmit outcomes to the casino server 102. The casino server 102 may then store the outcomes in a current session database 214 such as depicted in FIG. 11. The casino server 102 may refer to the current session database 214, for example, in order to determine when two group members have received key outcomes within a certain number of spins of one another. The casino server 102 may also refer to the current session database to obtain outcomes from one group member to be displayed to another. At the end of the group session, the casino server 102 may refer to the current session database 214 to determine aggregate group results and thus, to determine whether the group should be awarded a prize.

4. Facilitating Interaction Among Group Members

In Step S4, the system 100A, 100B may enable group members to interact passively or actively in a number of different ways. In some embodiments, as each group member generates results, the casino server 102 may transmit the results to be displayed to other group members. Group members may chat with one another. Group members may view video images of each other. Group members may also view video images of each other's gaming devices or computer screens where outcomes are displayed. Group members may provide each other with advice on any games requiring decisions. A first group member may even take control of a second group member's gaming device 104 and make remote decisions for the second group member.

The display of one playing group member's results to another may create an important cohesion among group members. Suppose Linda and Mary compose a two-person playing group. The group will win a bonus prize if, together, Linda and Mary can gross $800 in an hour. As the end of the hour approaches, Linda might be discouraged after a long losing streak. However, she might check a display of Mary's results, and see that Mary has been doing quite well. This might encourage Linda to maintain her rate of play, and to thereby help the group achieve its goal.

As another example, Mark and John compose a two-person group that will win $10,000 if both achieve "bar-bar-bar" within 1 minute of each other. When Mark sees that John has obtained "bar-bar-bar" as an outcome, Mark will have a minute of intense excitement as he makes handle pulls and hopes to achieve "bar-bar-bar" himself.

In some embodiments, the casino server 102 may track the results of the group and display the results to one or more group members. The display may be made on the display screen 308 of the gaming device 104. There, the display might include a bar graph showing the names of group members along the x-axis, and some measure of the group members' results along the y-axis. The display may include other graphs, such as a line graph showing the group's aggregate results over time. For example, the x-axis may represent time and the y-axis may denote net tokens won by the group as a whole. The display may further incorporate the group's goal. For instance, the group members may view a graph of the group's gross winning as it approaches a bold red line, representing the threshold amount of winnings necessary for the group to win a group prize. An exemplary graph 700 of a group's gross winnings as a function of time is depicted in FIG. 7.

In some embodiments, a group may be provided with the option to purchase additional time and/or handle pulls to meet the group objective. For example, a group that perceives that they might not achieve the objective, perhaps based upon viewing a progress graph display 700, may determine that with five additional minutes they will improve their chances of achieving the group objective on time. In such an embodiment, a casino server 102 may provide a physical or touch screen button available to players that grants an extension of time in exchange for a fee, an altered group objective, or the use of modified payout tables.

Group results may also be displayed on the credit meters of each group member's gaming device. Typically, a credit meter shows the number of credits an individual user has at a gaming device. The user may, at any time, receive cash in exchange for these credits. However, in playing group embodiments, the credit meter may show the total number of credits won by the group, or some other statistic. In these embodiments, the user may not be able to receive cash in exchange for the balance on the credit meter.

Group results may also appear on the display of a player tracking card reader. A player tracking card reader can typically display a few dozen characters, and often displays a greeting message such as "Welcome Linda Brown." However, in playing group embodiments, the player tracking card reader might display a group member's most recent outcome, the gross winnings of the group, etc. In some embodiments, group results may be printed on the back of cashless gaming receipts.

For group members gaming at other devices, a display of group results may occur on the monitor of a personal computer, or on the screen of a cell phone or personal digital assistant. Group results may be audibly communicated. For example, the casino server 102 may periodically announce a group's progress via speakers attached to group members' gaming devices. The casino server 102 may also periodically update a voice response unit with group results. Group members may then call the voice response unit to hear group updates.

In some embodiments, a display may show group results as well as the results of individual group members. For example, each time Samantha gets four cards to a royal-straight-flush in video poker, other group members may see a miniature version of her screen displayed in a corner of theirs. That way, the other group members may watch as she draws the fifth card. The same process may occur when other members of Samantha's group achieve four cards to a royal-straight-flush.

In embodiments involving asynchronous play, a group member who is playing at a later time may view a display of the results of a group member who had played at an earlier time. Suppose, as described in a prior example, that Jack and Henry win a substantial prize if they both achieve a four-of-a-kind within three spins of one another. Jack is the first to play. When Henry plays several hours later, he may view on his screen all of Jack's outcomes that are relevant to Henry's current outcome. For example, if Henry is on his $10^{th}$ spin, Henry sees a display of Jack's outcomes on Jack's $7^{th}$, $8^{th}$, $9^{th}$, $10^{th}$, $11^{th}$, $12^{th}$, and $13^{th}$ spins. If any of the displayed outcomes are four-of-a-kind, then Henry knows that he has a chance on his current spin to get four-of-a-kind and to thereby win the substantial prize for Jack and himself.

In some embodiments, displays may show the progress of other groups as well. For example, assume the Palm Yacht Club is competing against the Florida Shuffleboard Team. Each group member from the Palm Yacht Club may see a display not only of the Palm Yacht Club's results, but of the Florida Shuffleboard Team's results as well.

In some embodiments, a group member may be required to give permission for other group members or for people outside of the group to see the group member's outcomes. Others may be allowed to see some information pertaining to the group member's outcomes, but not all information. For example, other group members may see a first group member's outcomes, but not the amount of money the group member wagered, nor a tally of the first group member's net winnings.

During the course of play, group members may have a number of reasons to chat with one another. Group members may chat simply to socialize. Group members may express to one another excitement and disappointment upon the occurrence of various outcomes. Group members may encourage or congratulate one another. Group members may agree on times to break, on times or places to eat, on places to meet, etc. One group member might suggest to another that he move to a new, "hotter" gaming device. Also, one group member may provide advice to another as to how to make a particular decision. For example, one member might tell another, "You want to discard that pair and go for the straight-flush." There are many other reasons group members might want to communicate. Therefore, a means of communication among group members can add significantly to the gaming experiences of the individuals involved.

Group members may chat using a number of different means. The casino server 102 may, for instance, host chat rooms. Each group may receive its own private chat room. Group members may then communicate with each other by keying in messages to their personal computers or gaming devices and routing the messages through the chat room. In some embodiments, group members communicate via instant messaging protocols such as the AOL Instant Messenger℠, or ICQ™. Group members may also chat via audio channels. For example, a group member may speak into a microphone attached to his gaming device. The group member's voice may then be digitized, transmitted over the casino slot network, and converted back to audio using a speaker at another group member's gaming device. Group members using personal computers may verbally communicate over the Internet using Internet phone technology such as that possessed by Net2Phone®. Group members may chat using email. Group members in physical proximity may chat without electronic intermediation. There are many other ways by which group members might chat.

One function of group formation in a casino setting may be for one group member to more easily find out when another group member begins gambling. Thus, when a person inserts a player tracking card into a gaming device 104, the gaming device 104 may notify the casino server 102 of the person's identity. The casino server 102 may then consult the group database 210 to see whether the person is a member of any groups. If the person is a group member, then the casino server 102 sends messages or other indicators to the other group members indicating that the person is now gambling, available to chat, etc. In some embodiments, these messages may be sent only to other group members who are themselves gambling, available to chat, etc.

In some embodiments, group members may view images or video feeds of one another. In some embodiments, a casino security camera may be trained on a first group member. Other group members may view the video feed of the first group member. In some embodiments each group member may have a portion of his gaming device's display screen devoted to video feeds of other group members. In some embodiments, the video feed of a particular group member may become prominent on all group members' screens only when the particular group member has won a significant prize. For example, when Sam gets a "seven-seven-seven" in three-reel slots, the casino server 102 may direct the gaming devices 104, 106, 108 of the other group members to enlarge the video feed of Sam, so that the other group members know Sam has won and can see his excitement. Similar embodiments may apply to still images of group members. For instance, when one group member wins, his still image may be shown to the others. In some embodiments, when a first group member chats with a second group member, the first may see a video feed (or still image) of the second, and vice versa.

In some embodiments, group members may be represented on each other's displays as cartoon images (i.e. avatars) or symbols instead of by their own images. In such embodiments, when a first group member chats with a second, each may see the other's avatar speaking. When a first group member scores a win, the other group members may see the first group member's avatar do a little dance.

Group members may also see cartoon or other virtual representations of each other's gaming devices. For example, when John gets a royal-straight-flush, Sarah sees a cartoon representation of John's gaming device display. The cartoon shows pictures of the five cards, i.e. Ace(hearts), King (hearts), Queen(hearts), Jack(hearts), 10(hearts).

5. Terminating the Linked Play According to the Group Format

In Step S5, the linked play session may end after a group objective has been satisfied and/or achieved or once the linked play completes according to the group format. Thus, in some embodiments, linked play may terminate, for example, after some predetermined time period, after a predetermined number of handle pulls by each or all group members, once one or more group members have exhausted a certain number of tokens, once one or more members or the group as a whole has achieved a goal, once it is clear the group will not achieve a goal, once it is clear that one group member has won, or one group member has lost, once one or more group members has obtained one or more predetermined outcomes, and/or once one or more group members has obtained one or more predetermined symbols In some embodiments, arrangements or measures may be provided to accommodate a group with a member who wishes to quit the group during linked play. For instance, a group member may not wish to make any further wagers or the group member may be required to be somewhere else. The group member may wish to quit despite a designated group format requiring all group members to place a certain minimum number of wagers, to spend a certain amount of time gambling, etc.

Thus, when a group member quits a group, and informs the casino server 102 that he is quitting, various measures may be taken as a result of the loss to the group. These measures may include allowing other group members to substitute their own contributions for that of the lost group member. For example, where a group's objective involves achieving gross winnings in excess of a certain threshold, if a group member quits, then another group member's winnings may be counted twice towards the group goal. An alternative solution might be for other group members to be given more time to gamble towards the group goal.

An additional potential measure may include modifying the group objective. The group objective may be modified to be more suitable for the remaining members of the group. For example, in a five-person group, where any two group members may split a bonus prize for attaining the outcome of "orange-orange-orange" within one minute of one another, if any one group members quits, it becomes more difficult for the others to obtain the bonus prize, since each remaining group member now only has three others with which to potentially split the prize. One way to make up for the loss of the group member would be to allow any two group members among the remaining four to win the bonus prize upon achieving "orange-orange-orange" within two minutes of one another rather than within one minute. Another solution might be to increase the amount of the bonus prize.

An additional potential measure may include finding a new person to replace the departing group member. The new person may or may not be required to pay an entry fee for joining the group.

An additional potential measure may include the casino reducing the prize that may be won by the group. The casino may reduce the prize for several reasons. First, it might be easier for the group to win the prize after a group member has left. For instance, if a group's goal is based on net winnings, the goal might be smaller and thus, more attainable with fewer people playing, since the odds in most games are in the casino's favor. Secondly, the casino is benefiting less from the gambling activities of the group, so may be able to justify only a reduced prize.

An additional potential measure may include dissolving the group and any entry fees may be fully or partially returned. There are many other possible measures that might be taken if a group member quits. If a group member quits without informing the casino server 102 (either directly or via other group members), then measures may or may not be taken, depending on whether the quitting has benefited the group. Generally, if a group member's quitting has benefited the group, then the group member may not have satisfied some rule or rules required as part of the group format. For example, if each group member is required to make 1000 handle pulls during a session, and a group member quits after having made 600 handle pulls, then the group member has not met the requirements specified as part of the group format. Whether or not a quitting group member informs the casino server, various penalties may be levied against the group member or the group. These include reduced potential prizes, reduced chances at prizes, deductions of credits from a credit balance, etc.

In some embodiments, an entire group or a significant portion of a group may quit upon the agreement of one or more group members and there may be a way for the group to settle with the casino. For example, if a group is 80% of the way towards achieving an objective, but wishes to quit early, then the group may quit and receive, say, 50% of a prize. There are many other possible methods of settlement.

6. Determining Whether the Group Objective was Achieved

Once the group session has ended, the casino server 102 may then determine the outcome of the group session in Step S6. The casino server 102 may determine the outcome by, for example, referring to the current session database 214 of FIG. 11, obtaining an aggregate group result, obtaining the description of the appropriate group objective from the group session database 212 of FIG. 10, and comparing the group result to the group objective. If, for example, a group of five people was trying to achieve net winnings of $100 in order to win a meal for each member, then the casino server 102 compares a tally of the group members' net winnings to the threshold of $100. If the tally of net group winnings exceeds the threshold, then the casino server 102 may instruct each group member's gaming device 104 to print a meal ticket in Step S7. If the group play involved group members competing against one another for a prize pool, then the casino server 102 may determine the winning group member, and signal that group member's gaming device 104 to pay the winner the amount of the prize pool in Step S7.

7. Awarding Prizes if the Group Objective was Achieved

Once the casino server 102 has determined the result of group play, including competitions, then, in Step S7, it may allocate prizes based on the result. For instance, as suggested above, the winner among a group whose members competed with one another for a prize pool would receive the prize pool. The casino server 102 may refer to the group session database 212 of FIG. 10 in order to determine what prizes to award, and how to distribute any prizes amongst the group members. The casino server 102 may then signal the gaming devices 104, 106, 108, (112, 114) operated by the winners among the group members to dispense the appropriate prizes. Alternatively the winners may receive their prizes at a location within the casino.

F. EXAMPLE ILLUSTRATIVE EMBODIMENTS OF THE INVENTION

The following very specific examples are provided to illustrate particular embodiments of the present invention, particularly from the perspective of potential users of the system 100A, 100B including players and casinos.

(a) Example 1

Walter and Brenda have been married for thirty-five years. At least once a month, they visit a nearby casino together to play video poker. On one particular visit, Walter and Brenda sat down at adjacent video poker machines and inserted their respective player tracking cards. The display screen on Brenda's machine then displayed a message for her. It read:

> Brenda, we'd like to welcome you and your husband back to our casino. We notice you play here frequently together. How would you and your husband like to try group play? The way it works is simple. You play just as you did before. Only now, if both you and your husband get a straight flush within one minute of each other, you split a bonus payout of 1000 tokens! The payout for a solitary straight flush is just a little lower, 40 tokens instead of 50 tokens. Press the 'accept' button below if you would like to commence group play. We will then ask your husband if he wants to play. If he agrees, then you are all set.

Brenda liked the idea of group play. It would allow Walter and her to work together in order to win. She talked over the concept with Walter and then touched the "accept" button on her display screen. Soon, Walter got a similar message to the one Brenda had received, and he too touched "accept." Brenda and Walter then began playing.

Over the next several hours, there were several occasions when either Walter or Brenda achieved a straight flush. They hardly noticed the slightly smaller payout as the winner cheered the other on for the next minute, hoping the other would also attain a straight flush. Although they ended up not winning the bonus payout, both Walter and Brenda enjoyed the group excitement, and resolved to continue playing as a group during subsequent visits to the casino.

(b) Example 2

Linda, Jane, Sue, and Mary were long time friends who enjoyed an occasional group trip to the casino. The only drawback of going together was that it always seemed one of them would have very good gambling results, and another would have bad results. They would thus leave the casino in disparate emotional states. One day, Linda noticed a promotion in a mailing sent to her by the casino. The promotion said that several people could join a play group to link their winnings together. Each play group member would put the same amount of money into a pool. Each play group member's wager would then come from the pool, and all winnings would go into the pool. The pool would then be divided evenly among all group members at the end of a gaming session. In this way, if one or two group members went on a lucky streak, all group members would share in the luck.

Linda spoke to Jane, Sue, and Mary, and all agreed to form a play group with linked winnings. On their next drive up to the casino, they agreed on a group name: "Linked Destiny." When each later sat down at her respective slot machine, she selected a "group play" option from a menu on the touch screen of her slot machine. She then keyed in the name of the group she wanted to join, "Linked Destiny," using a keypad displayed on the touch screen. After Linda, Jane, Sue, and Mary had keyed the group's name into their slot machines, each was given a list of the other group members, and asked to confirm that she wanted to join a play group with the others. Each confirmed. Then, each was asked to insert $100 into her gaming device, and each did so. Then play commenced.

After Linda had made a few handle pulls, she was pleased to see a small window appear in the upper right hand corner of her display screen. In the window, Linda could see displayed how much money remained in the common pool. She also could see each of her friends' outcomes as they occurred. For instance, the display would flash the name "Mary" and show Mary's outcome of "cherry-lemon-bell". Then the display would flash "Jane" and show "bell-bell-plum". Linda found play to be much more exciting, as she now had four people's outcomes to follow rather than just her own.

Today was Sue's day to be lucky. She seemed to hit payout after payout. Although the others did not do as well, the common pool ended up at $480. Each left with a small profit of $20 due to Sue's good luck. All were in a good mood on the ride home.

(c) Example 3

A group of five people got together, each person was a dollar slot machine player. Each member of the group contributed $20 to an initial wager placed with the casino. The group would then play for an hour, and if the group's net winnings for the hour exceeded $200, the wager would pay back $200 to each person. Each person would also keep any winnings sustained at his machine during the one-hour session, and would absorb any losses.

(d) Example 4

Joe and Sam were two avid video blackjack players. They would always argue about who had done better during a particular session. So one day, Joe and Sam decided to join a group for the purposes of competing against one another. As part of the group, Joe and Sam each agreed to place a $15 wager to be held by the casino. At 8:00 pm, whoever had netted the most money, or lost the least money at video blackjack would win the other's $15 wager. The only stipulation was that each had to wager at least $1000 in total at video blackjack. The stipulation would prevent either Joe or Sam from stopping early and allowing the other to lose money due to the negative expected net winnings to be derived from video blackjack.

Joe and Sam played vigorously throughout the day. When it got to be 8:00 pm, both had lost more than $100. But Sam did not mind because he had lost less than Joe, and so got to keep Joe's $15. There was no argument about whom was the victor.

(e) Example 5

An elderly couple from Stamford, Conn. traveled frequently to a nearby casino. The couple was interested in meeting another couple from Stamford who also liked to gamble. Perhaps the two couples could travel to the casino together, and maybe also get together for lunch and a game of bridge. On one visit to the casino, the couple registered for a competition. The hour-long competition would be against another couple, to see which couple could hit the most payouts in excess of 20 tokens at a traditional three-reel fruit slot machine. The casino would buy lunch for the winners at the casino restaurant.

When the couple registered for the competition they asked that the casino server 102 match them with another couple, both aged 60 or older, who lived in Stamford, Conn., and enjoyed bridge. The casino was able to find a match for them, and the competition ensued. The initiating couple lost the competition, but they were pleased to meet their opponents at the restaurant later that day. The two couples soon became good friends, and from then on always traveled to the casino together.

(f) Example 6

Tony was on the Internet at his favorite casino Web site. Tony was interested in joining a group and having a chance of winning a group progressive prize. Tony therefore clicked a link that brought him to a Web page listing the available groups. Next to each group was listed the size of the progressive prize, and the amount required to join the group. Tony would be required to pay some money to join a group since his wagers had not yet contributed anything to the progressive prize. Tony saw one group of 100 people that had a progressive prize of $500 and rising. Tony clicked on the link to join the group. He then authorized the deduction of $5 from his credit card account to join the group, and the $5 then went into the progressive pool. Tony authorized the deduction of another $100 from his credit card account in exchange for 100 virtual casino tokens. Tony then began playing his favorite game: video poker.

G. ADDITIONAL EMBODIMENTS OF THE INVENTION

Group members may be distributed across multiple casinos. In some embodiments, a third-party server 110 may transmit and receive communications from individual casino servers. The third-party server 110 may track group information such as group members' names, financial account identifiers and locations. The third-party server 110 may also track group statistics, such as net group winnings, individual group members' winnings, number of jackpots won by the group, etc. In this regard, the third-party server 110 may assume many of the functions the casino server 102 had in embodiments where all group members played at a single casino. The third-party server 110 may transmit any group information or statistics to the casino servers so that the information might be displayed to the group members at the gaming devices. Meanwhile, casino servers may continue to receive information from group members and from group members' gaming devices, and pass the information along to the third-party server 110. Two group members at different casinos may chat with one another, for example, by routing a first group member's signal through the slot network of the first casino to the first casino server; by then routing the signal from the first casino server 102 to the third-party server 110; then from the third-party server 110 to the second casino server; and finally from the second casino server 102 through the slot network of the second casino to the second group member.

Where multiple group members play at different casinos with different owners, it may be necessary for the casinos to split the cost of any prizes given to the group. In some embodiments, any prizes awarded to the group or to individual group members may be paid by each participating casino in proportion to the number of group members that were playing at that casino. In some embodiments, each prize is paid by the casino or casinos at which prize-winning outcomes were won. For example, the Slot Kings group may win a minivan if any two group members achieve a jackpot outcome within one hour of one another. If two members of the group playing at casino A achieve the jackpot outcome, then casino A may be responsible for paying for the minivan. However, if one group member had been at casino A and the other at casino B, then the two casinos might split the price of the mini-van. Those skilled in the art will recognize that there are many other possible ways to determine how to split the cost of the prize for a group among multiple casinos.

In some embodiments, a group member may be required to play at multiple casinos in order to win a prize.

In some embodiments of the present invention, not all of the outcomes of all of the group members are used to determine whether the group has achieved the group objective. In some embodiments, only the outcomes of the most successful player or players may be used. In some embodiments, only the outcomes of the least successful player may be used. In some embodiments, only the outcomes that occurred during a specific time period may be used.

Although the system of the invention has been described as one or more gaming devices 104, 106, 108 networked to a casino server 102, the invention applies to other games and gaming environments. For example, the invention may be applied to table games, such as table poker and blackjack. In such embodiments, players may insert their player tracking cards into card readers corresponding to seats around, for example, a poker table. The casino server 102 could access group data and transmit that data to a data terminal located at the dealer. The dealer could then communicate the relevant linked play information to the player.

In some embodiments of the present invention, as applied to table games, a dealer may manually provide many of the functions of a casino server. One challenge at table games involves tracking the results of playing group members, since the processing power and memory present in a gaming device 104 may not necessarily be available at a table game. In some embodiments, every time a group member achieves an outcome that counts towards a group objective, a casino employee may place a marker on the table to represent the outcome. For example, a blackjack player belongs to a group that wins five sets of round-trip plane tickets to Las Vegas from anywhere in the United States, provided the group members can achieve 100 blackjacks amongst themselves in the span of an hour. Then, every time a group member achieves a blackjack, the dealer places a special chip in a circle marked on the table in front of the group member. At the end of an hour, the number of blackjacks the group member has achieved can be discerned from the number of special chips in the circle in front of the group member.

In some embodiments, an electronic counter is affixed to the blackjack table (or craps table, roulette table, etc.). Every time a group member achieves an outcome of importance, the dealer may press a button on the counter to increment the count of the number of outcomes attained by the group member. Alternatively, an electronic scanner may automatically detect outcomes achieved by a group member, and cause the electronic counter to increment upon the attainment of such an outcome.

A single group member may game at multiple gaming devices, and have his results at each gaming device 104 count towards a personal or group goal. For example, if Sam and Henry wish to achieve "bell-bell-bell" within 10 seconds of one another, then Sam and Henry may improve their chances by each playing three gaming devices at once. Perhaps this allows them to increase their individual rates of play, when a rate of play is measured over three gaming devices instead of one. With higher effective rates of play, Sam and Henry are more likely to achieve "bell-bell-bell" within 10 seconds of one another.

Playing groups may gain an increased sense of camaraderie by wearing apparel tailored to the group. For example, group members may each wear group hats or group T-shirts containing the name of the group. In some cases, group apparel might show the results of the group (e.g. the group won $500 in 2003). There might be group mugs, group key chains, and other group trinkets. Group members might each receive tracking cards displaying special group colors, showing the name of the group, or otherwise indicating group membership. All group-related products might be provided by the casino as a benefit of group formation. Group related products might also be given out as prizes. The casino might also charge for the products. One benefit of a playing group registering prior to visiting a casino, is that the casino may have time to arrange for the manufacture of the items prior to group members' arrival at the casino.

One or more group members may be able to negotiate for certain benefits to be given a group in exchange for the group's business at a particular merchant. A group may negotiate for better odds at gaming devices, discounted rooms, discounted meals, discounted show tickets, increased rates of complimentary points (comps), additional casino-sponsored group prizes, and so on. For example, Sheryl might contact a casino server 102 and mention that her playing group, The Casino Ladies, would be interested in spending a weekend at the casino if each group member could receive half price on her room. The casino, server might then grant the half-priced rooms to each group member, in view of low fill rates, or in view of the group's heavy gambling in the past. In some embodiments one or more group leaders or representatives of the group receives a benefit in exchange for getting the other group members to either come to the casino, to increase their quantity of gambling, or to otherwise increase their consumption at the casino.

A gaming device 104 typically includes one or more physical buttons for use in issuing commands to the gaming device 104. For example, one plastic button might indicate a bet of 1 coin, another plastic button might indicate a bet of 2 coins, and a third plastic button might say "spin." In some embodiments of this invention, the existing buttons on a gaming device 104 may be used for alternative purposes. For example, a button that is typically used to bet 3 coins may now be used to open a chat line with group member number 3. Many other uses for buttons are possible.

In some embodiments, a first group member may never know the identity of another member of his group. He might instead know only a screen name. A person in one group may never know the identity of a person in another group against which his group is competing.

In some embodiments, a winner of a competition among group members may get to keep all of the group's total net or gross winnings.

In some embodiments, a competition whose outcome is dependent in some way on a group member's amount of play may help the casino to increase the group member's amount of play. For example, if the winner of a competition is the person with the highest gross winnings, then a group member might be encouraged to make more wagers so as to have more chances to increase his gross winnings. This, in turn, may increase casino profits.

In some embodiments, the casino server 102 may attempt to pair a slow (as measured by handle pulls per hour) and a fast player into a group. The casino server's 102 goal in doing so would be to allow the faster player to influence the slower player to play more rapidly.

In some embodiments, the winner of a competition might be the group or the group member who lasts the longest in the face of some adverse condition. Some exemplary adverse conditions may include fatigue, losing outcomes, bankruptcy, poor statistics, and being voted out. In fatigue based adverse condition embodiment, the winner is the group member who can physically gamble the longest without collapsing from exhaustion. In a losing outcomes based adverse condition embodiment, group members may drop out of a competition upon, for example, obtaining five losing outcomes in a row and the winner is the last remaining group member. In a bankruptcy based adverse condition embodiment, groups or group members may be forced to drop out of a competition when they run out of money, or when they lose a predetermined amount of money. In a poor statistics based adverse condition embodiment, group members may be competing with one another for a prize and, for example, the group member with the lowest net winnings after a set time period may be dropped from the group. This process may repeat until only one group member, the winner, remains. In a "being voted out" based adverse condition embodiment, the group may periodically vote a member out of the group. The last remaining group member wins.

In some embodiments that include a competition between groups, individual group members may drop out periodically due to an adverse condition. At the end of a set time period, the group with the most remaining members wins.

In some embodiments, one use of an audio communications channel between competing group members or competing groups may be used for the purpose of trash talking. The casino server 102 may, however, censor any trash talking, or any communication in general, using casino chat rooms facilities or other casino sponsored communication means.

In some embodiments, a playing group may include a multi-day competition among group members, with a subset of the group members being eliminated every day. Those group members that remain at the end of each day may receive a free or discounted room at the casino's hotel for the night. Alternatively, group members who are eliminated may receive a free or discounted hotel room in order to encourage them to remain at the casino even after having been eliminated from competition.

In some embodiments where group members compete, one group member may be able to use defensive tactics to nullify another group member's progress. For example, Tim and Arthur are competing to see who gets the most payouts in excess of 20 coins. However, if Tim gets a shield symbol, Tim can hold onto it, and the next time Arthur gets a 20 coin payout, Tim can use his shield symbol to stop the 20 coin payout from being counted for Arthur in the competition. There are many variations to the use of defensive tactics. Perhaps Tim is not allowed to spin while holding the shield symbol. Perhaps Arthur can get another symbol that protects him against the nullifying effects of the shield. In some embodiments, one group member might periodically be allowed to take a symbol from a second group member, even though the second group member does not desire to give up the symbol. The symbol may help the first group member, or its loss may hurt the second group member.

In some embodiments, group members can use their own symbols to help other group members. For example, Sheila gets an outcome of: Ace(hearts), King(hearts), Queen (hearts), Jack(hearts), 3(diamonds), at video poker. Meanwhile, Samantha is dealt a hand containing the 10(hearts) at her own video poker machine. Samantha may then give her 10(hearts) to Sheila so that Sheila might complete her royal-straight-flush. The royal-straight-flush may or may not then win as much as it would have had Sheila completed it on her own.

In some embodiments, group members may be required to make handle pulls during a limited time window. For example, a group wins a prize based on its gross winnings between 2:30 pm and 3:30 pm. Thus, if a group member's gaming device 104 malfunctions, or when a group member's Internet connection fails, the group member or the group may be put at a disadvantage. Therefore, in some embodiments, the casino server 102 may maintain a record of when a group member's gaming device 104 malfunctions, or when a group member's Internet connection fails. For example, the casino server 102 may receive a periodic signal from a group member's gaming device 104 confirming that the gaming device 104 is functional. If the casino server 102 does not receive the signal during a time when the signal should have been sent, then the casino server 102 may conclude that the gaming device 104 has malfunctioned, and may record the time of malfunction in a log.

In some embodiments, a gaming device 104 might also actively indicate that it has malfunctioned by sending a malfunction signal to the casino server. The casino server 102 may later record the time at which a gaming device 104 has resumed function, as indicated by a resumption of the periodic signal from the gaming device. In some embodiments, when a group member's gaming device 104 malfunctions, the group member may move to a new gaming device 104 and resume play. The casino server 102 may receive the group member's identifier from the new gaming device 104 and record the time at which the group member has resumed play. A similar system may be used to detect when a group member has been disconnected from the casino server's Web site. For example, the group member's personal computer may cease transmitting signals to the casino server's Web site, and resume once the group member has been reconnected.

Thus, in some embodiments, the casino server 102 may record a log of when a group member has been unable to participate in the group activity due to some kind of malfunction. The casino server 102 might then compensate the group member or the group for lost activity. For example, the casino server 102 might allow one or more group members to gamble at a time outside of the originally designated time period, but have the gambling count towards group activity. In some embodiments, the casino server 102 may grant the group member or the group some number of tokens, points, symbols, etc., representing that which the group member or group might have expected to achieve during the lost time. In some embodiments, the entire group may be required to start the group session from the beginning at a later time period. In still other embodiments, the group or group member may simply be given all or a portion of the prize he might have won had he not been cut off. However, in some embodiments, the casino server 102 may elect not to compensate the group or group member for lost time if, for example, the group member is at fault.

In some embodiments, at the end of a group session, one or more group members may receive a document, certificate, trophy, receipt or other form of recognition as to the performance of the group or the group member. A group member may use such recognition, for example, to prove that he won a contest against another group member. Having the chance to win a contest against a friend and having the ability to prove the win may motivate a person to gamble at a casino.

In some embodiments, a group or individual group members may be granted a form of insurance. For example, if each member of the group loses more than $50 during a gaming session, the insurance is activated and each group member receives $30 from the casino. The group may be granted insurance simply for agreeing to gamble at the casino. Alternatively, the group may be required to pay an insurance premium in order to have the chance at receiving insurance.

In some embodiments, a group gambling session may occur over a designated time interval, e.g. 11:00 am to 12:00 pm. However, each group member may have the option, or may be required to take one or more breaks during the gambling session. For example, each group member may be required to break for ten minutes during the interval of 11:00 am to 12:00 pm. Each group member may then take the break during any ten-minute period within the hour-long interval. A group member may use the break time, for example, to use the rest rooms, to obtain refreshments, to walk around, and so on. Requiring all group members to take a break ensures that a group member who needs to use the rest room facilities, for example, is not at a disadvantage to someone who plays for the entire session. In some embodiments, if a group member has not taken a break during a session, and the time remaining in the session is equal to the length of the break, then the casino server 102 may automatically prevent the group member from participating for the remainder of the session.

In some embodiments, group members in competition with one another may take breaks without being put at a disadvantage by setting up an automatic gambling system. Such an automatic gambling system may be embodied as a program that may be executed on the gaming device 104. For instance, a group member who needs to take a break may be able to key instructions into his gaming device 104 that causes the gaming device 104 to continue generating outcomes at the rate of 20 per minute until the group member returns to the machine.

In some embodiments, the casino may provide certain benefits to group members to better facilitate social interaction. For instance, the casino may provide group members with adjacent hotel rooms and/or the casino may reserve adjacent gaming devices for group members. The casino may also reserve blocks of adjacent seats at a show, adjacent tables at restaurants, seats at the same gaming table, etc., for members of a single group.

In some embodiments, a player device, such as a wireless PDA, may be used to invite a player to a linked play-enabled gaming device 104 and it may alert the gaming device 104 to the player's proximity using, for example, a wireless protocol (such as Bluetooth as described at http://www.bluetooth.com/dev/specifications.asp ). Once identified, a users' information may be automatically transferred to the gaming device and log him into group play. By merely approaching an enabled gaming device, the player's device could trigger the gaming device 104 to configure itself to support the player's current group play session. In some embodiments, a cell phone/PDA may be used to track and record the player's performance and winnings information for a given linked play session.

In some embodiments, a remote group member may log onto a casino server 102 directly, bypassing any third-party server 110. Alternatively, a player could log onto a gaming device 104 directly, bypassing the casino server 102.

H. CONCLUSION

It is clear from the foregoing discussion that the disclosed systems and methods to facilitate linked gaming represents an improvement in the art of electronic commerce and gaming. While the method and apparatus of the present invention has been described in terms of its presently preferred and alternate embodiments, those skilled in the art will recognize that the present invention may be practiced with modification and alteration within the spirit and scope of the appended claims. The specifications and drawings are, accordingly, to be regarded in an illustrative rather than a restrictive sense.

Further, even though only certain embodiments have been described in detail, those having ordinary skill in the art will certainly appreciate and understand that many modifications, changes, and enhancements are possible without departing from the teachings thereof. All such modifications are intended to be encompassed within the following claims.

What is claimed is:

1. A method comprising:

determining that a group of players is associated with linked game play;

determining that a first outcome at a first gaming device of the plurality of gaming devices combined with a second outcome at a second gaming device of the plurality of the gaming devices results in a combined winning outcome;

pooling funds from players within the group for wagering use by the group as they gamble; and providing an indication of the combined winning outcome to the group.

2. The method of claim 1 wherein determining that the first outcome combined with the second outcome results in a combined winning outcome comprises evaluating individual gross winnings associated with the first and second outcomes.

3. The method of claim 1 wherein determining that the first outcome combined with the second outcome results in a combined winning outcome comprises evaluating individual net winnings for players of the first and second gaming devices.

4. The method of claim 1 wherein determining that the first outcome combined with the second outcome results in a combined winning outcome comprises determining that the first and second outcomes are of a particular type.

5. The method of claim 4 wherein determining that the first and second outcomes are of a particular type comprises determining that the first and second outcomes are poker hands of a certain value.

6. The method of claim 1 wherein determining that the first outcome combined with the second outcome results in a winning outcome comprises determining that the first and second outcomes contain a predetermined number of corresponding symbols.

7. The method of claim 1 wherein at least one of the plurality of gaming devices comprises a mobile terminal.

8. The method of claim 1 wherein the first gaming device is positioned remotely from the second gaming device and the gaming devices are operatively connected through the internet.

9. The method of claim 1 further comprising accepting an entry fee for at least one player using a gaming device within the plurality of gaming devices.

10. The method of claim 1 further comprising enabling communication between players within the group.

11. The method of claim 10 wherein enabling communication between players within the group comprises enabling at least one of: email communication, voice communication, and video communication.

12. A method comprising:

determining that a group is associated with multiplayer game play;

determining that a first outcome at a first gaming device of the plurality of gaming devices combined with a second outcome at a second gaming device of the plurality of the gaming devices results in a combined winning outcome;

pooling funds from players within the group for wagering use by the group as they gamble; and providing an indication of the combined winning outcome to the group.

13. A system comprising:

a first gaming device;

a second gaming device; and a controller operatively coupled to the first gaming device and the second gaming device, the controller adapted to:

determine that a group is associated with linked game play;

enable linked game play via at least the first gaming device and the second gaming device;

determine that a first outcome of the first gaming device combined with a second outcome of the second gaming device results in a combined winning outcome;

pool funds from players within the group for wagering use by the group as they gamble; and provide an indication of the winning outcome to the group.

14. The system of claim 13 wherein the first gaming device is a mobile terminal.

15. The system of claim 14 wherein the mobile terminal comprises at least one of: a laptop computer, a wearable computer, a cellular/wireless phone, a palm-top computer, a hand-held computer, and a personal digital assistant.

16. A computer readable medium comprising software with instructions to:

determine that a group is associated with linked game play;

enable linked game play at a plurality of gaming devices;

determine that a first outcome at a first of the plurality of gaming devices combined with a second outcome at a second of the plurality of gaming devices results in a combined winning outcome;

pool funds from players within the group for wagering use by the group as they gamble; and provide an indication of the winning outcome to the group.

17. A method comprising:

determining that a group is associated with linked gambling game play;

enabling linked game play at a plurality of gaming devices;

affirmatively establishing a rule that determines how linked game play may be terminated;

pooling funds between members of the group for use by the members for wagering at the gaming devices; and terminating linked game play according to the rule.

18. The method of claim 17 wherein the rule that determines how linked game play may be terminated comprises a rule that linked game play terminates on achievement of a group objective.

19. The method of claim 17 wherein the rule is based on at least one of: an elapsed amount of time; a number of executed game plays; an amount wagered;

identifying a winning member within the group, determining a losing member within the group; occurrence of one or more types of outcomes; occurrence of one or more particular outcomes; and occurrence of one more predetermined symbols.

20. The method of claim 17 wherein the rule is based on an amount wagered.

21. The method of claim 20 wherein rule is based on an amount wagered individually by members of the group.

22. The method of claim 20 wherein the rule is based on an amount wagered collectively by members of the group.

23. The method of claim 17 wherein at least one of the plurality of gaming devices comprises a mobile terminal.

24. The method of claim 17 further comprising receiving a challenge from a first member of the group to be issued to a second member of the group.

25. The method of claim 17 further comprising collecting an entry fee from at least one member of the group.

26. The method of claim 17 further comprising enabling communication between members of the group.

27. The method of claim 26 wherein enabling communication between members of the group comprises enabling at least one of: an email communication, an instant messenger communication, an audio communication, and a video communication.

28. The method of claim 17 wherein establishing the rule comprises receiving an indication from at least one member of the group.

29. The method of claim 17 wherein establishing the group rule comprises receiving an indication from a casino associated with the plurality of gaming devices.

30. A system comprising:

a first gaming device;

a second gaming device; and a controller operatively coupled to the first and second gaming devices and adapted to:

determine that a group is associated with linked gambling game play;

enable linked game play through the first and second gaming devices;

affirmatively establish a group rule that determines how linked game play may be terminated;

pool funds between members of the group for use by the members for wagering at the first and second gaming devices; and terminate linked game play according to the group rule.

31. A computer readable medium comprising software with instructions to:

determine that a group is associated with linked gambling game play;

enable linked game play at a plurality of gaming devices;

affirmatively establish a group rule that determines how linked game play may be terminated;

pool funds between members of the group for use by the members for wagering at the gaming devices; and terminate linked game play according to the group rule.

32. A method comprising:

establishing a multiplayer gambling game on at least one gaming device wherein at least one player participates in the multiplayer gambling game through the internet;

determining a group outcome for the multiplayer gambling game;

creating a pool of funds for players of the multiplayer gambling game from which wagers are made; and providing an indication of the group outcome to players of the multiplayer gambling game.

33. The method of claim =wherein at least a second player participates in the multiplayer gambling game through a mobile terminal.

34. The method of claim =further comprising collecting an entry fee for participation in the multiplayer gambling game.

35. The method of claim 32 further comprising outputting video information about a first player to a second player.

36. A method comprising:

establishing a multiplayer gambling game on at least one gaming device wherein at least one player participates in the multiplayer gambling game through a local area network;

determining a group outcome for the multiplayer gambling game;

creating a pool of funds for players of the multiplayer gambling game from which wagers are made; and providing an indication of the group outcome to players of the multiplayer gambling game.

37. A method comprising:

receiving personal information from a player of a multiplayer gambling game;

generating a pool of funds for the multiplayer gambling game from which players may make wagers; and displaying the personal information to another player of the multiplayer gambling game.

38. The method of claim 37 further comprising determining a group outcome for the multiplayer gambling game.

39. The method of claim 38 further comprising providing an indication of the group outcome to players of the multiplayer gambling game.

40. The method of claim 37 further comprising registering players for the multiplayer gambling game.

41. The method of claim 37 wherein the personal information comprises at least one of: an occupation, a hobby, biographical information, and pictures.

42. The method of claim 37 further comprising receiving a request for multiplayer play from a first player.

43. The method of claim 42 further comprising transmitting a challenge to a second player in response to the request from the first player.

* * * * *